US010166829B2

(12) United States Patent
Hubert et al.

(10) Patent No.: US 10,166,829 B2
(45) Date of Patent: Jan. 1, 2019

(54) STRUT MOUNT BEARING UNIT

(71) Applicant: Aktiebolaget SKF, Gothenburg (SE)

(72) Inventors: Mathieu Hubert, Ann Arbor, MI (US); Thomas Lepine, Villandry (FR); Massimo De Francisco, New Hudson, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/371,647

(22) Filed: Dec. 7, 2016

(65) Prior Publication Data
US 2017/0158012 A1  Jun. 8, 2017

Related U.S. Application Data

(60) Provisional application No. 62/264,654, filed on Dec. 8, 2015.

(51) Int. Cl.
*B60G 7/02* (2006.01)
*F16C 19/16* (2006.01)
(Continued)

(52) U.S. Cl.
CPC ............ *B60G 7/02* (2013.01); *B60G 15/068* (2013.01); *F16C 19/16* (2013.01); *F16C 19/163* (2013.01); *F16C 27/08* (2013.01); *B60G 2200/142* (2013.01); *B60G 2202/312* (2013.01); *B60G 2204/12* (2013.01); *B60G 2204/124* (2013.01); *B60G 2204/128* (2013.01); *B60G 2204/41* (2013.01); *B60G 2204/418* (2013.01);
(Continued)

(58) Field of Classification Search
CPC .... B60G 7/02; B60G 15/068; B60G 2206/73; B60G 2204/12; B60G 2202/312; B60G 2204/418; B60G 2204/124; B60G 2204/128; B60G 2200/142; B60G 2204/41; F16C 19/16; B62D 21/11
See application file for complete search history.

(56) References Cited

U.S. PATENT DOCUMENTS 5,467,971 A * 11/1995 Hurtubise ............ B60G 15/068
                                                   188/322.12
7,032,912 B2 * 4/2006 Nicot ..................... B60G 17/04
                                                       267/267
(Continued)

*Primary Examiner* — Darlene P Condra
(74) *Attorney, Agent, or Firm* — Mark Ussai; SKF USA Inc. Patent Dept.

(57) ABSTRACT

A strut mount and bearing assembly includes a strut mount having upper and lower ends, a central bore for receiving a shock absorber end and an annular upper race surface between the upper and lower ends and extending circumferentially about the bore. The upper end is fixedly connectable with a vehicle body and has a flat attachment surface disposeable against a vehicle surface of the vehicle body. A first bearing race is disposed on the mount and a spring seat having a second bearing race is movably coupled with the strut mount. The seat also has a lower end with spring engagement surface and a second bearing race is disposed on the seat spaced axially from the first bearing race. Rolling elements are disposed between the first and second bearing races to form a bearing. The various components are formed and sized to make an axially compact assembly.

22 Claims, 25 Drawing Sheets

(51) Int. Cl.
*B60G 15/06* (2006.01)
*F16C 27/08* (2006.01)
*B62D 21/11* (2006.01)

(52) U.S. Cl.
CPC .......... *B60G 2206/73* (2013.01); *B62D 21/11* (2013.01); *F16C 2326/05* (2013.01)

(56) References Cited

U.S. PATENT DOCUMENTS

| | | | | |
|---|---|---|---|---|
| 7,114,853 | B2* | 10/2006 | Debrailly | B60G 15/068 384/612 |
| 7,192,041 | B2* | 3/2007 | Nicot | B60G 17/019 188/321.11 |
| 7,811,005 | B2* | 10/2010 | Beghini | B21D 53/10 280/124.155 |
| 9,340,086 | B2* | 5/2016 | Corbett | B60G 15/067 |
| 2012/0146306 | A1* | 6/2012 | Dubus | B60G 15/068 280/124.155 |
| 2012/0161414 | A1* | 6/2012 | Scolaro | B60G 15/068 280/124.155 |
| 2016/0223023 | A1* | 8/2016 | Lee | F16F 1/127 |

* cited by examiner

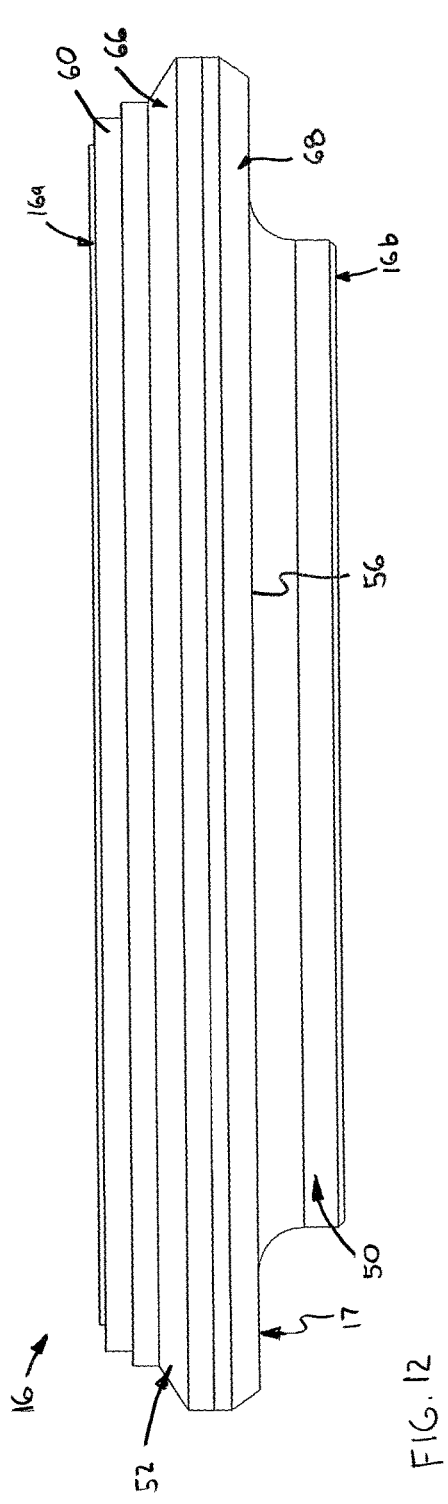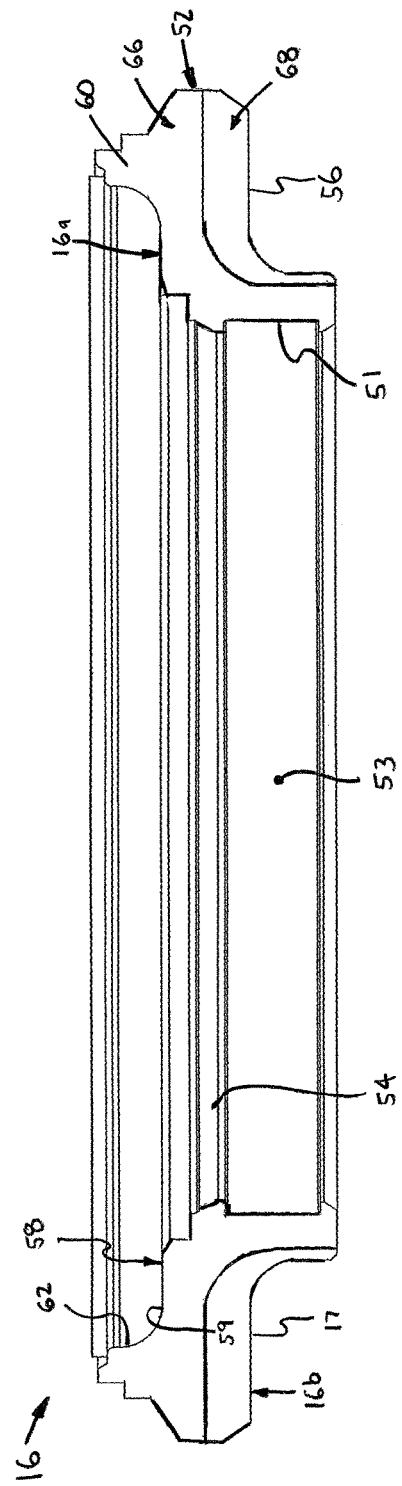

STRUT MOUNT BEARING UNIT

BACKGROUND OF THE INVENTION

The present invention relates to vehicle strut assemblies, in particular to strut mounts including bearings.

Strut mount assemblies are known and are used to connect a vehicle strut with a vehicle frame or body. A typical strut assembly, for example a McPherson strut assembly, includes a strut mount attached to the vehicle frame or body and a shock absorber disposed within a tubular housing connected to a steering knuckle of the wheel hub and having a shaft attached to the strut mount. A coil spring extends between the tubular housing and an upper spring seat and a bearing assembly is disposed between and rotatably connects the upper spring seat with the strut mount. Generally, the separate bearing assembly and the spring seat are assembled onto the strut mount with no retention means or with a light press-fit of the bearing assembly inside of the strut mount. In certain applications, the centerline of the load applied by the spring upper end (i.e., onto the spring seat) is angled with respect to the centerline of the shock absorber, which either causes transverse loading on the bearing or necessitates orienting certain components to align the bearing with the spring, which typically increases the amount of space required between the vehicle frame and the steering knuckle.

SUMMARY OF THE INVENTION

In one aspect, the present invention is a strut mount and bearing assembly is provided for connecting a wheel strut unit with a vehicle body, the strut unit including a shock absorber with a shaft extending along a central axis and a suspension spring having a load centerline. The assembly comprises a strut mount having upper and lower ends, a central bore extending generally between the upper and lower ends and a generally annular upper race surface disposed between the upper and lower ends and extending circumferentially about the bore. The upper end is configured to fixedly connect with the vehicle body and has a generally flat attachment surface extending substantially perpendicularly to the centerline and disposeable against a surface of the vehicle body. The strut mount central bore is configured to receive an upper end of the shock absorber shaft and has a centerline extending generally collinearly with the shock absorber axis. A generally annular, first bearing race is disposed on or provided by the upper race surface of the strut mount and has a central axis, the bearing race axis being generally coaxial or parallel with the spring centerline. A spring seat is movably coupled with the strut mount and has an upper end with a generally annular lower race surface and a lower end with a generally circular engagement surface. The engagement surface is contactable by an upper end of the suspension spring and has a center and a diameter. Further, a generally annular, second bearing race is disposed on or provided by the lower race surface of the spring seat and is arranged facing generally toward and spaced axially from the first bearing race. Also, a plurality of rolling elements disposed between the first and second bearing races so as to form a bearing. Furthermore, the strut mount and the spring seat are each sized and configured such that a ratio of the diameter of the spring engagement surface to an axial distance between the upper attachment surface and the engagement surface center is greater than three.

In another aspect, the present invention is again a strut mount and bearing assembly for a wheel strut unit, the strut unit including a shock absorber with a shaft extending along a central axis, a suspension spring having a centerline angled with respect to the shaft axis. The assembly comprises a strut mount including a hub with a central bore for receiving an upper end of the shock absorber shaft, the bore having a centerline extending generally collinear with the shock absorber axis, and a generally cylindrical mount body with an upper end configured to fixedly connect with a vehicle body and a lower end. A generally cylindrical, elastomeric damper member is disposed generally coaxially between and connects the hub with the mount body. A generally circular, first bearing race is attached to the lower end of the strut mount so as to extend circumferentially about the damper member and having a central axis. The bearing axis is generally coaxial or parallel with the spring centerline. A spring seat is movably coupled with the strut mount so as to be angularly displaceable about the bearing axis and has an upper end and a lower end with a generally circular support surface contactable by an upper end of the suspension spring. A generally circular, second bearing race is attached to the upper end of the spring seat so as to be facing generally toward and spaced axially from the first bearing race and extending circumferentially about the damper member. Further, a plurality of rolling elements are disposed between the first and second bearing races so as to form a bearing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 12 is a side plan view of a spring seat of the first construction strut mount and bearing assembly;

FIG. 13 is an axial cross-sectional view of the spring seat of FIG. 12;

DETAILED DESCRIPTION OF THE INVENTION

Figure 1:
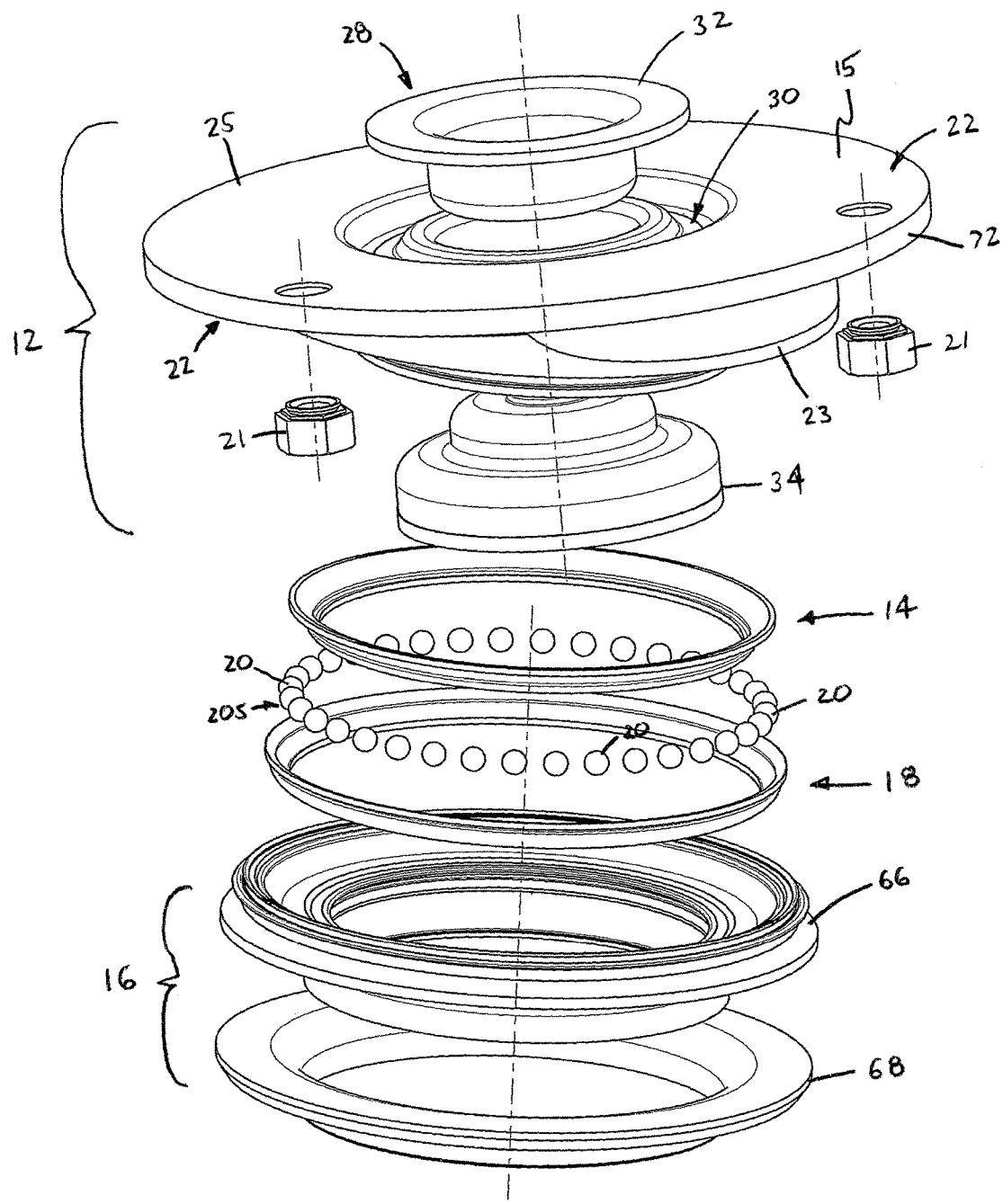
FIG. 1 is an exploded view of a first preferred construction of a strut mount and bearing assembly, shown with the bearing axis aligned with the centerline of the spring upper end load.
Figure 2:
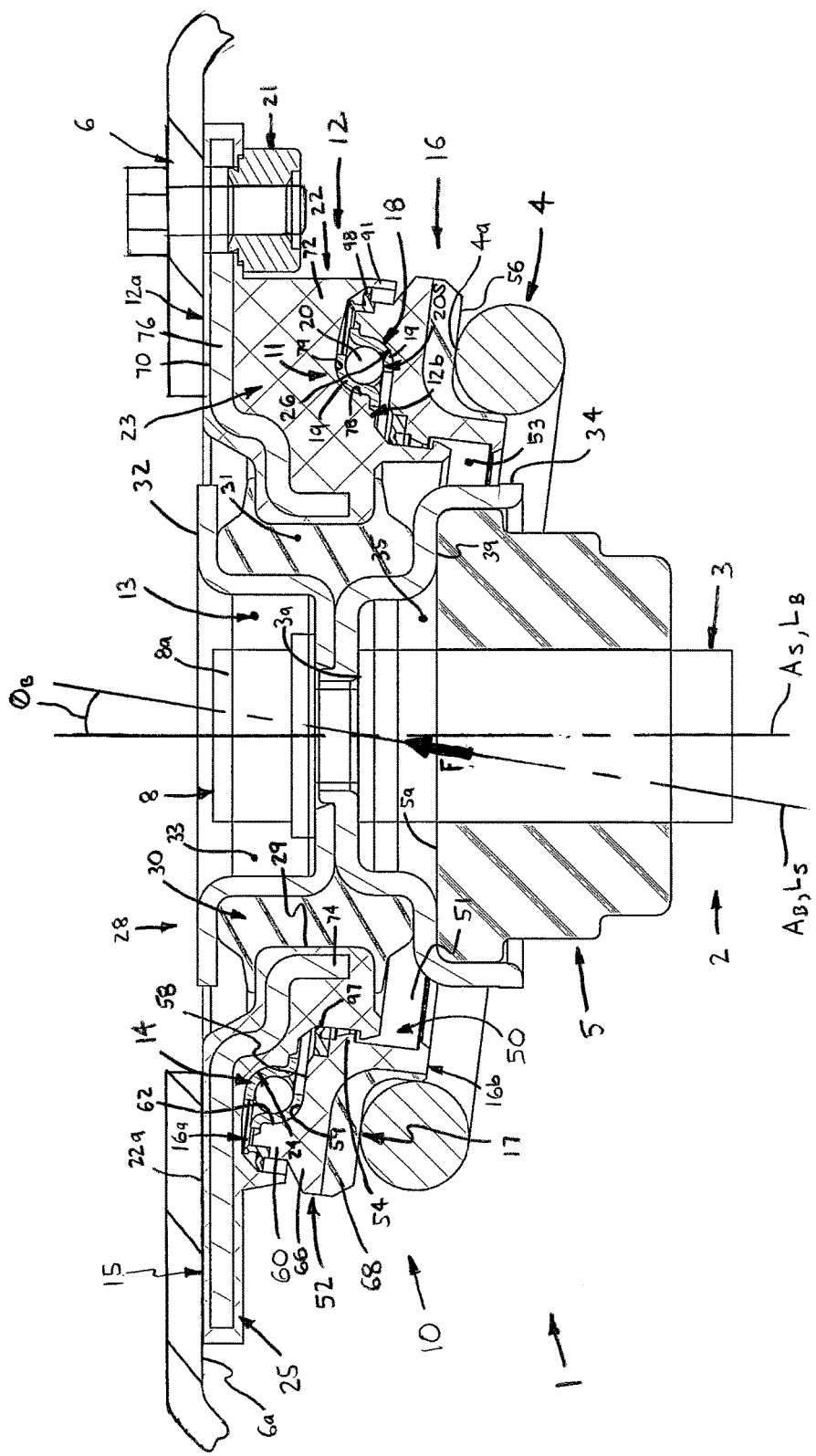
FIG. 2 is a cross-sectional view of the first construction strut mount assembly, taken along the shock absorber central axis.
Figure 3:
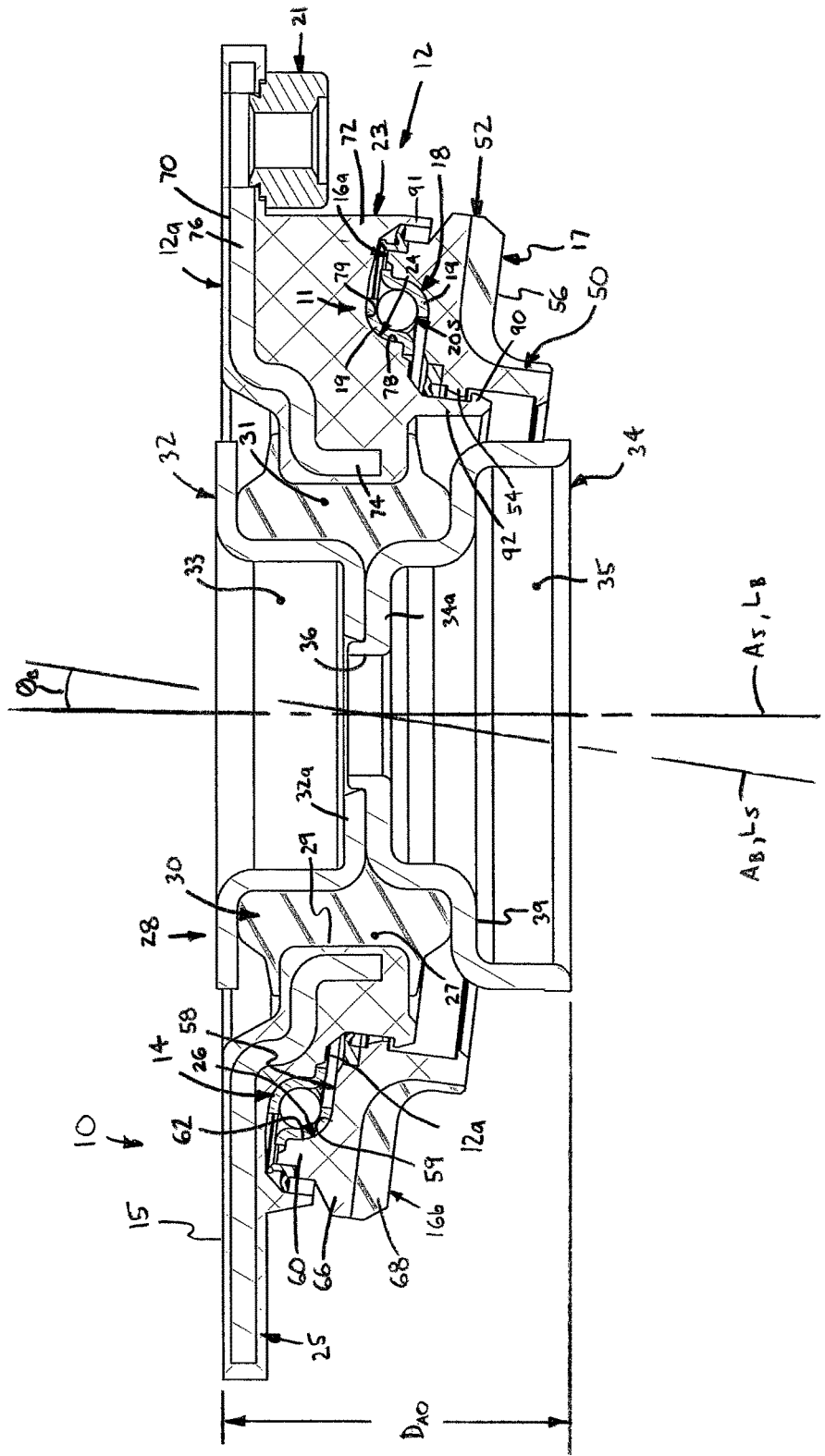
FIG. 3 is another view of the strut mount and bearing assembly of FIG. 2, shown without the suspension spring, shock absorber shaft and bumper.

Certain terminology is used in the following description for convenience only and is not limiting. The words "lower" and "upper" designate directions in the drawings to which reference is made and the words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-29 several alternative structures or constructions of a strut mount and bearing assembly 10 for a wheel strut unit 1. The strut unit 1 includes a shock absorber 2 with a shaft 3 extending along a central axis $A_S$ and a suspension spring 4 having an upper end load centerline $L_S$ (i.e., the line of force F as applied by the spring upper end 4a onto the spring seat 16 (described below)), either coaxial or parallel with, or angled with respect to, the shaft axis $A_S$. The strut unit 1 also includes a tubular member (not shown) disposed about the shock absorber 2 and supporting a lower end (not shown) of the spring 4 and a bumper 5 for transmitting axial loading from the shock absorber 2 to the strut mount assembly 10. The strut mount and bearing assembly 10 basically comprises a strut mount 12, a first, upper bearing race 14 disposed on or provided by the strut mount 12, a spring seat 16, a second, lower bearing race 18 disposed on or provided by the spring seat 16, and a plurality of rolling elements 20 disposed between, and rollable simultaneously upon, the first and second bearing races 14, 18 to form a bearing 11 with a pitch diameter $D_B$.

More specifically, the strut mount 12 has an upper end 12a, a lower end 12b, a central bore 13 extending between the upper end lower ends 12a, 12b and having a centerline $L_B$ extending generally collinearly with the shock absorber axis $A_S$, and a generally annular race surface 24 disposed between the upper and lower ends 12a, 12b. The strut mount upper end 12a is configured to fixedly connect with a vehicle body 6 (FIG. 2) and has a generally flat attachment surface 15 extending substantially perpendicular to the bore centerline $L_B$ and disposeable against a surface 6a of the vehicle body 6. Preferably, the strut mount 12 includes an integrated body 22 including a generally cylindrical central section 23 providing the strut mount lower end 12b and a generally annular flange section 25 extending radially outwardly from the central section 23 and providing the strut mount upper end 12a and the upper attachment surface 15. With this structure, the upper race surface 24 is formed on the cylindrical section 23 and has at least a portion, and in some constructions the entire surface 24, located generally adjacent to the flange section 25. Further, the strut mount bore 13 is configured to receive an upper end 3a of the shock absorber shaft 3 and has a centerline $L_B$ extending generally collinearly with the shock absorber axis $A_S$.

The first bearing race 14 is generally annular, is disposed on or provided by the upper race surface 24 of the strut mount 12 and has a central axis $A_B$, which is preferably generally coaxial or parallel with the spring centerline $L_S$ (FIGS. 1-27) but may be skewed with respect to the spring centerline (FIGS. 28 and 29), as described below. More specifically, in certain, "angled" constructions as depicted in FIGS. 1-15, the first race 14 is arranged on the strut mount 12 such that the bearing central axis $A_B$ is generally collinear or parallel with an "offset" spring load centerline $L_S$ (i.e., the centerline $L_S$ of the spring load or force F (FIG. 2) applied to the seat 16 is angled with respect to shock absorber axis $A_S$) and is skewed with respect to the bore centerline $L_B$ so as to define an angle $\theta_B$ with a value greater than zero degrees (i.e., the bearing axis $A_B$ and bore centerline $L_B$ are not parallel). In other, "symmetrical" constructions, as depicted in FIGS. 14-22, the first bearing race 14 is arranged on the strut mount 12 such that the bearing axis $A_B$ is generally collinear with the strut mount bore centerline $L_B$, and thus also the shock absorber axis $A_S$, or generally parallel to the shock axis $A_S$ with an offset in a "radial" direction (not depicted).

In all constructions disclosed herein, the spring seat 16 is movably coupled with the strut mount 12 so as to be angularly displaceable about the bearing axis $A_B$. The spring seat 16 has an upper end 16a with a generally annular, lower race surface 26 and a lower end 16b with a generally circular engagement surface 17. The spring engagement surface 17 is contactable by an upper end 4a of the suspension spring 4 and has a center $C_C$ and a diameter $D_C$. Further, the second bearing race 18 is generally annular, is disposed on or provided by the lower race surface 26 of the spring seat 16 and is arranged facing generally toward and spaced axially from the first bearing race 14.

Referring to FIGS. 5, 15, 18, 21, 24, 27 and 29, in each of the various constructions of the strut mount and bearing assembly 10, the strut mount 12 and the spring seat 16 are each sized and configured (i.e., formed and constructed as described herein and as depicted in the drawings) such that a ratio $R_1$ of the diameter $D_S$ of the spring engagement surface 17 to an axial spacing distance $d_{AS}$, the "spring axial distance", between the upper attachment surface 15 and the engagement surface center $C_C$ is greater than two (2); i.e., $R_1 = D_S/d_{AS} > 2$, more preferably greater than 3 and most preferably between 3.1 and 5.7. Further, the first race surface 24 is formed on the strut mount 12 such that a ratio $R_2$ of the bearing pitch diameter $D_B$ to an axial spacing distance $d_{AB}$, the "bearing axial distance", between the center of the pitch diameter $C_B$ and the strut mount attachment surface 15 is greater than three (3); i.e., $R_2 = D_B/d_{AB} > 3$, more preferably greater than 5 and most preferably between 5.5 and 11.1. Both of these relationships or ratios $R_1$, $R_2$ provide an indication of the "axial compactness" of the strut mount and bearing assembly 10 and are desired to have the stated values so as to maximize available space for the shock absorber 2 and the spring 4.

Figure 4:
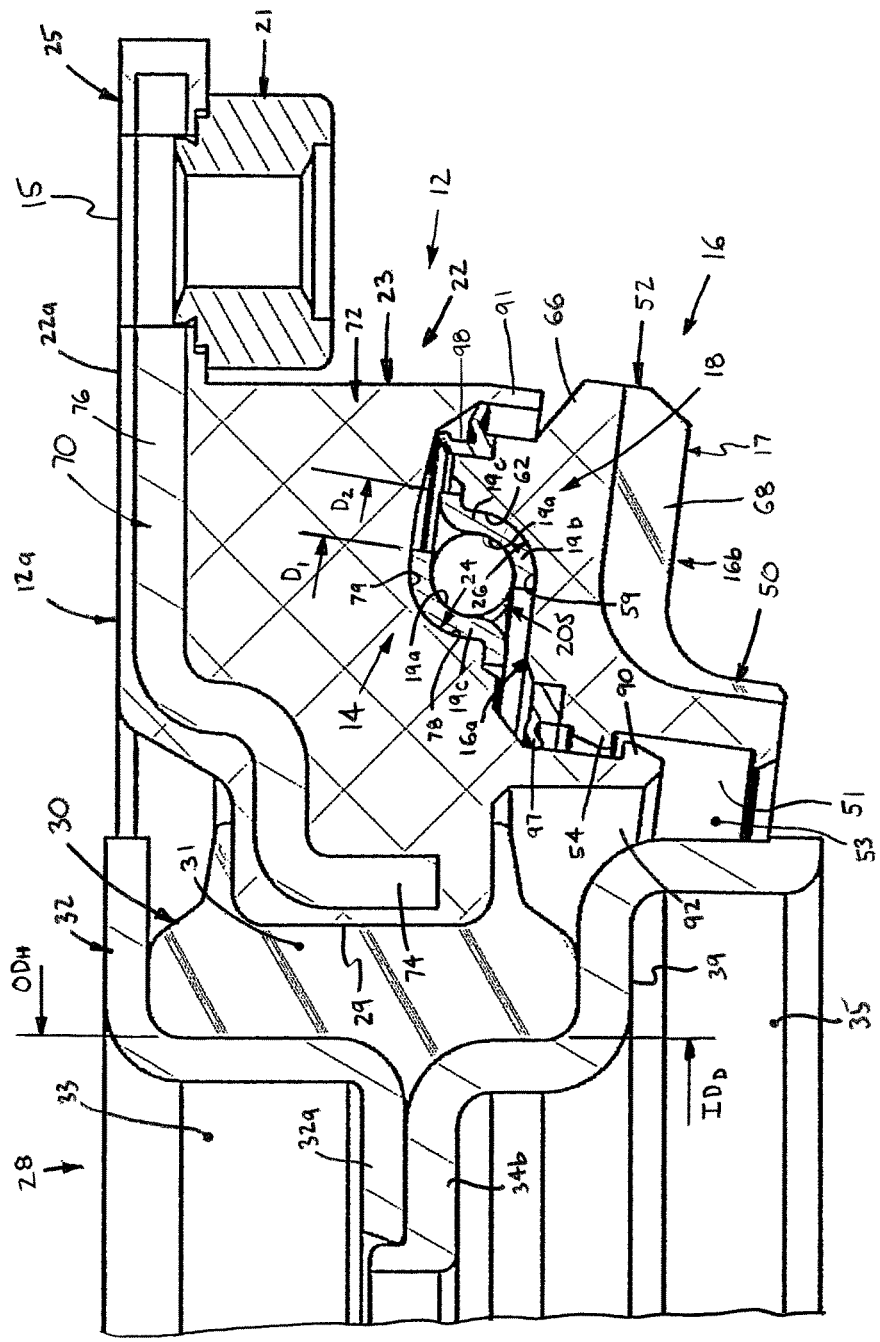
FIG. 4 is an enlarged view of a section of FIG. 3.
Figure 5:
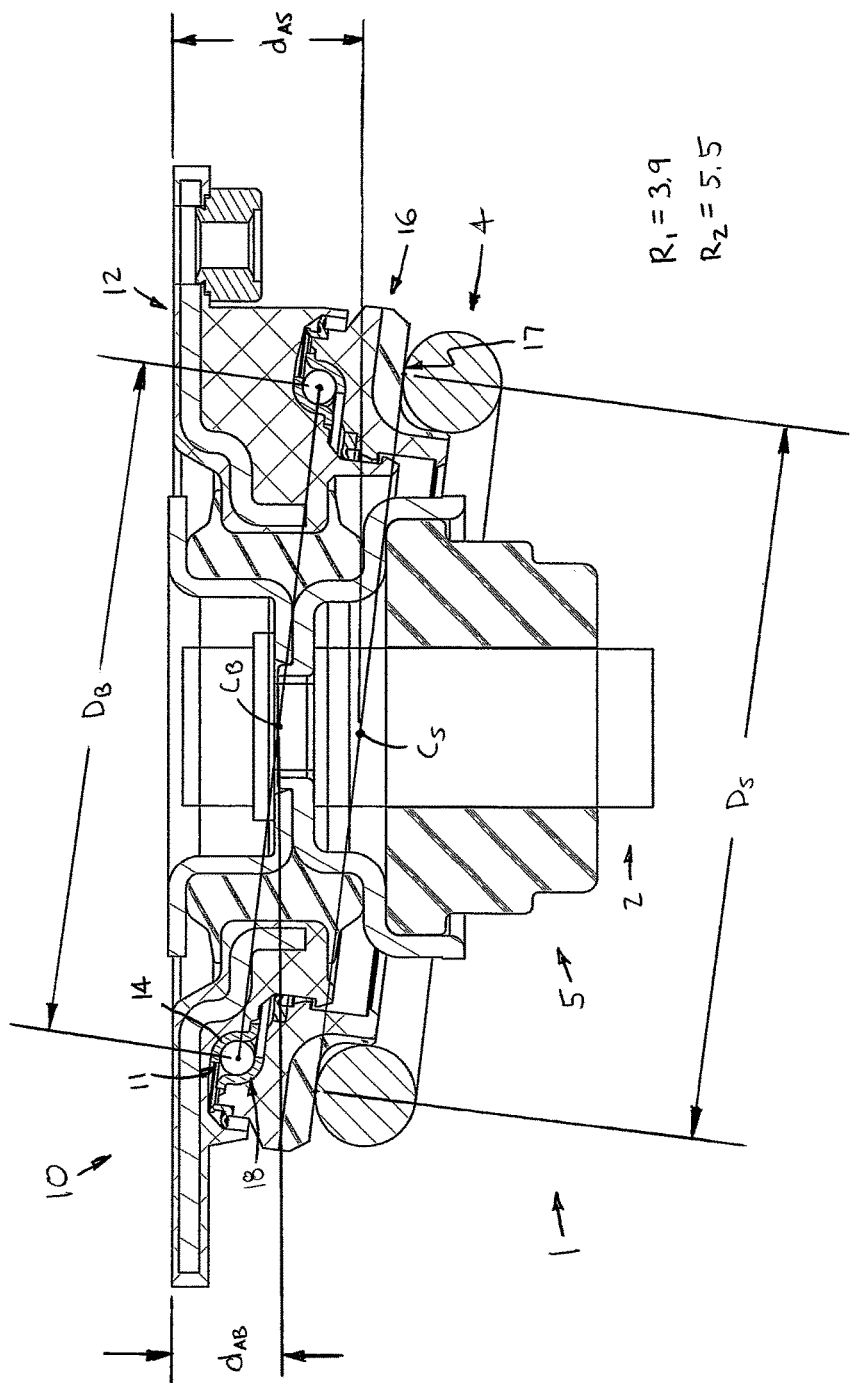
FIG. 5 is another view of the strut mount and bearing assembly of FIG. 2, indicating the spring seat engagement surface diameter, bearing pitch diameter and axial spacing of each from the strut mount attachment surface.
Figure 6:
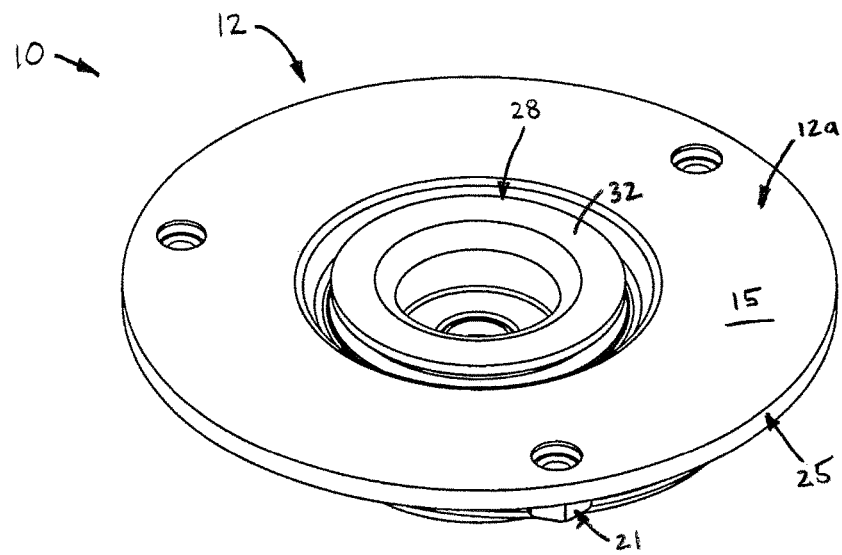
FIG. 6 is a top perspective view of the first construction strut mount and bearing assembly.
Figure 7:
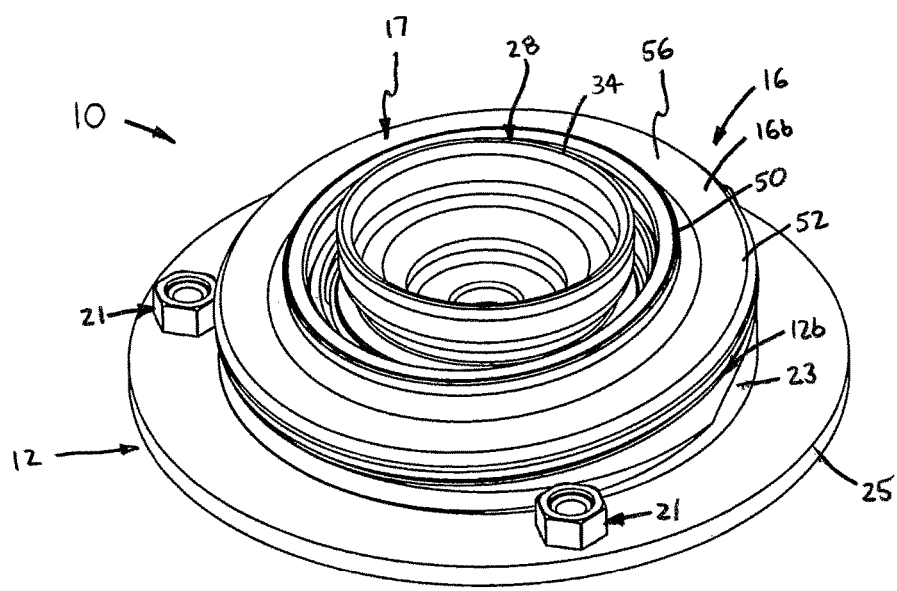
FIG. 7 is a bottom perspective view of the first construction strut mount and bearing assembly.
Figure 8:
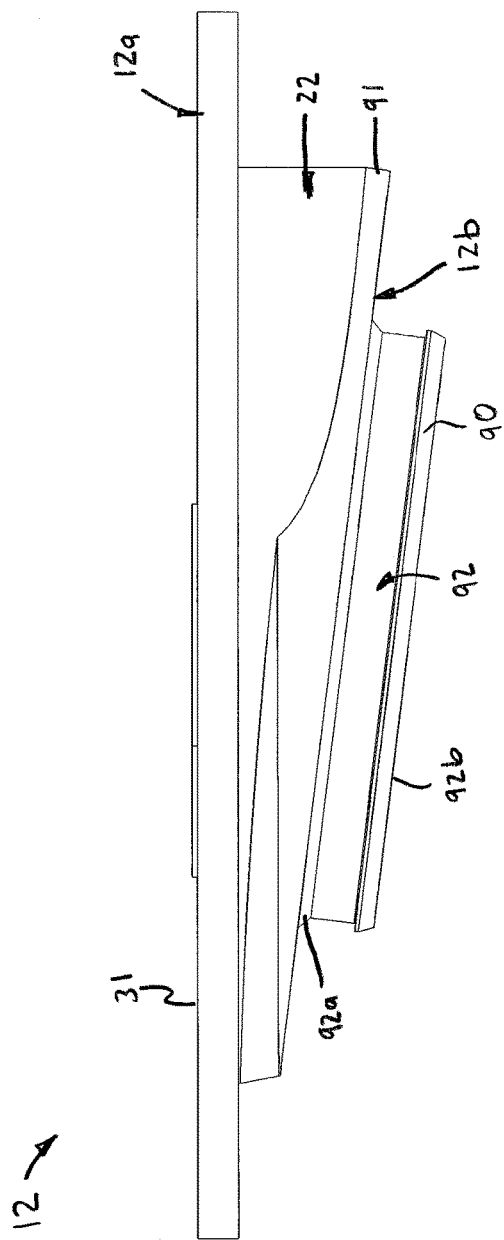
FIG. 8 is a side plan view of a strut mount of the first construction assembly.
Figure 9:
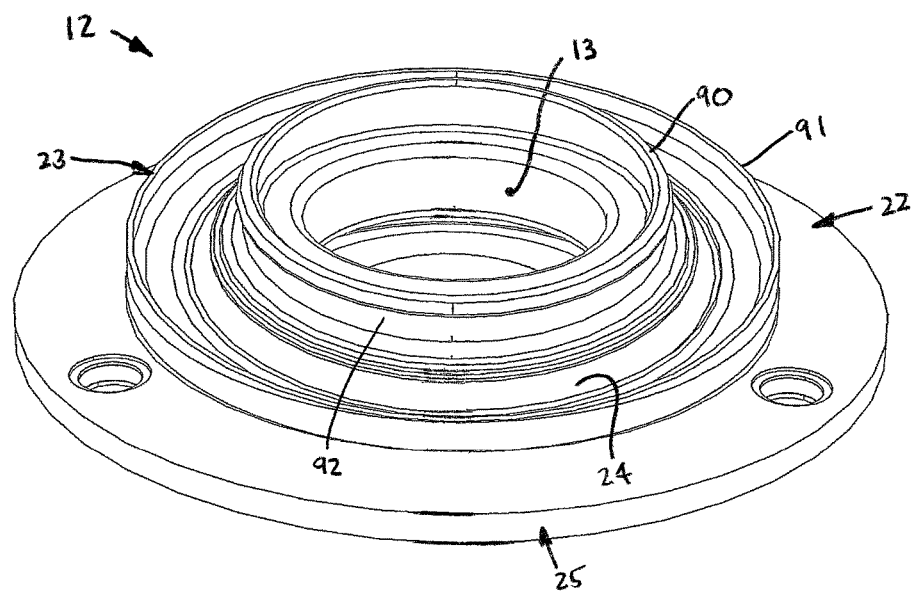
FIG. 9 is top perspective view of the strut mount of FIG. 8.
Figure 14:
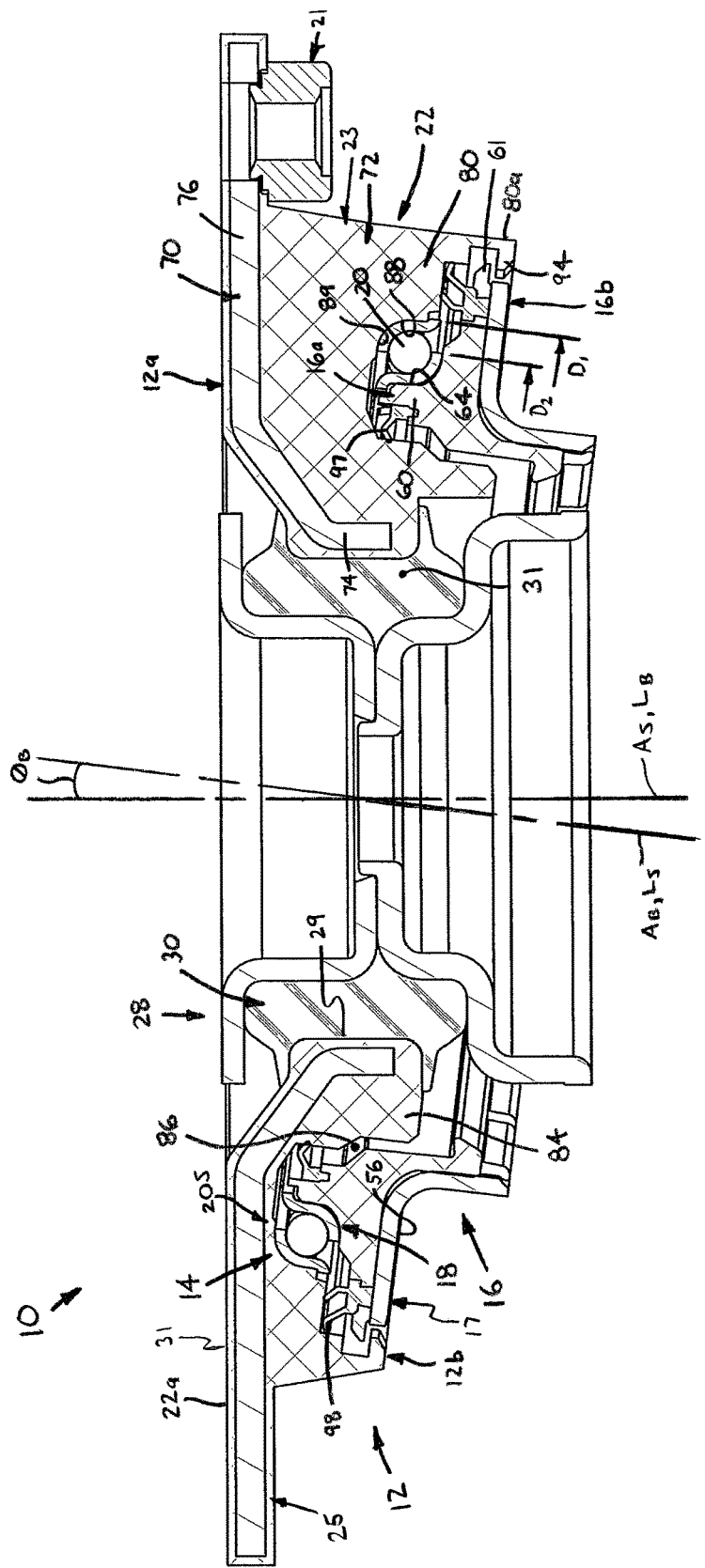
FIG. 14 is an axial cross-sectional view of an alternative construction of the strut mount and bearing assembly, having an upper bearing race diametrically larger than a lower bearing race, and including a steel spring seat surface.
Figure 15:
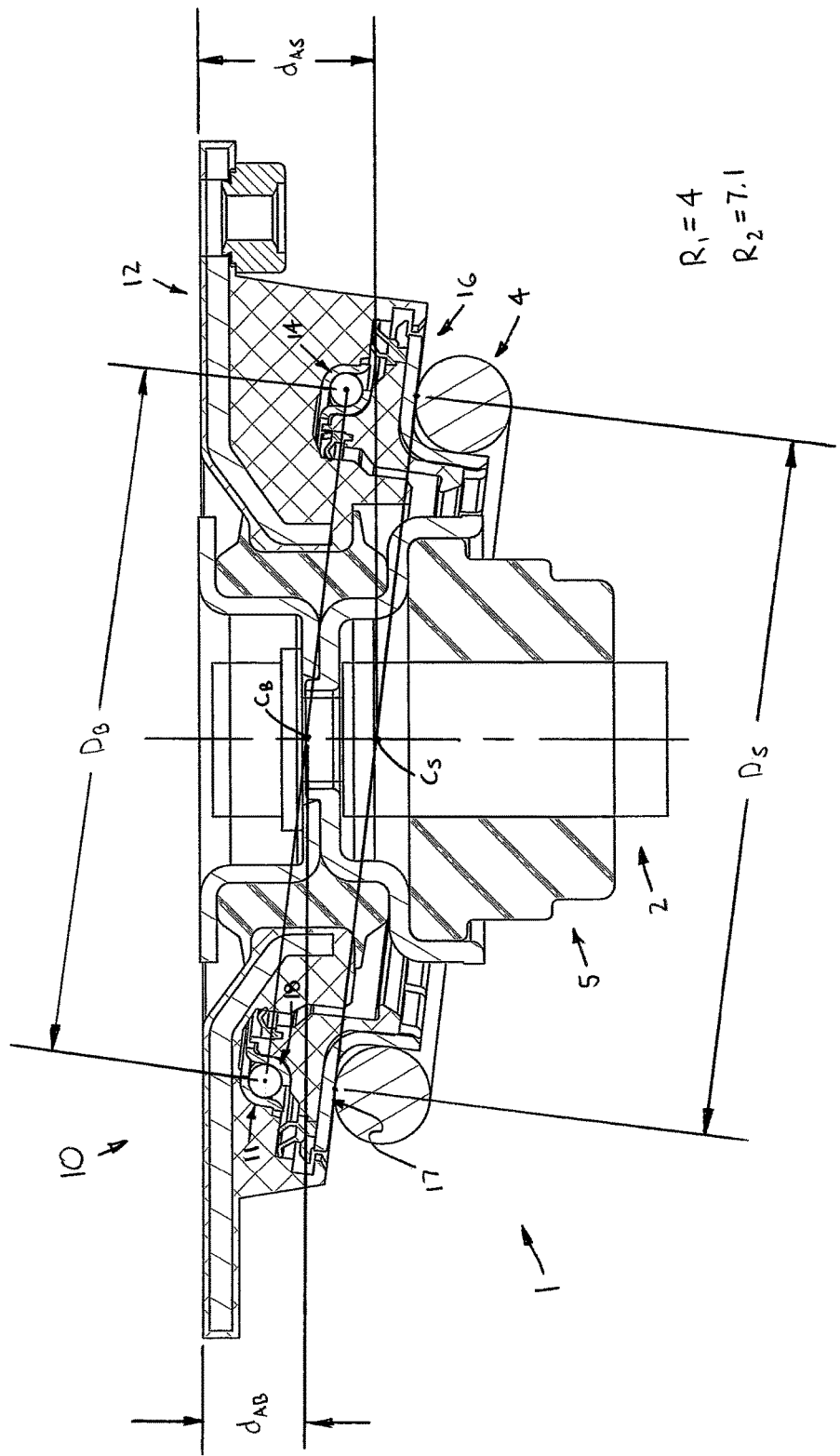
FIG. 15 is another view of the strut mount and bearing assembly of FIG. 14, showing the suspension spring, shock absorber shaft and bumper and indicating the spring seat engagement surface diameter, bearing pitch diameter and axial spacing of each from the strut mount attachment surface.
Figure 16:
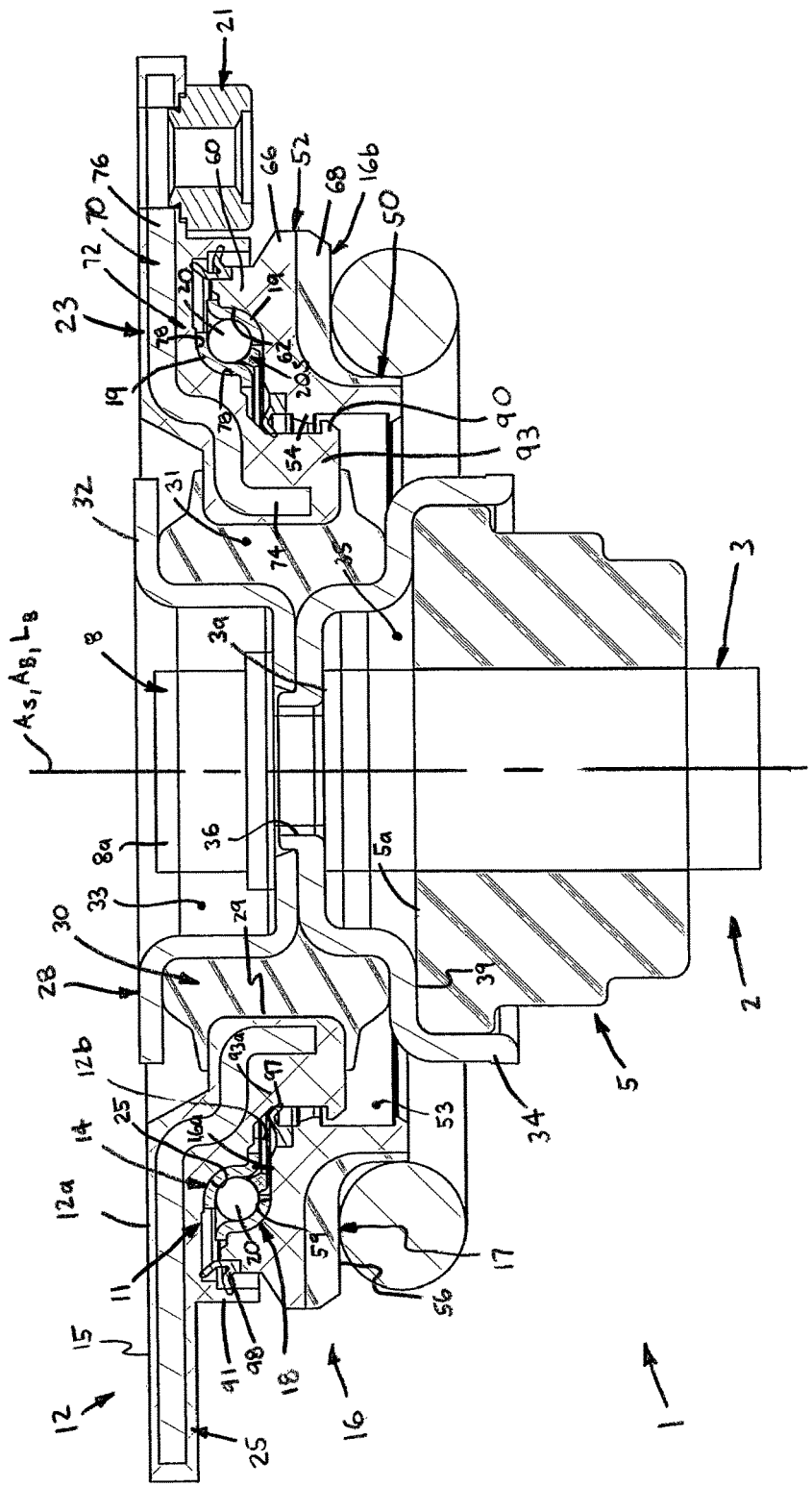
FIG. 16 is an axial cross-sectional view of a further alternative construction of the strut mount and bearing assembly, having a bearing axis aligned with the shock absorber axis.
Figure 17:
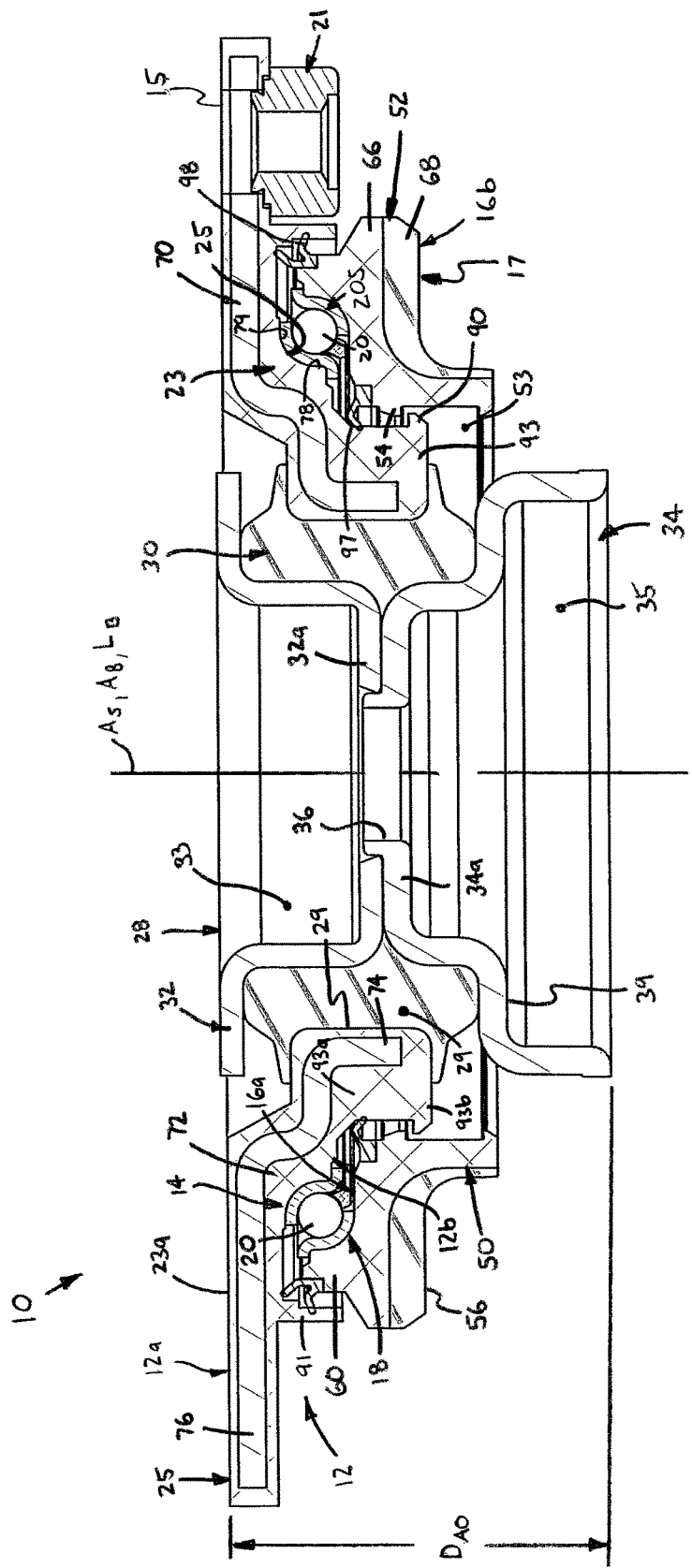
FIG. 17 is another axial cross-sectional view of the strut mount and being assembly construction of FIG. 16, shown without the suspension spring, shock absorber shaft and bumper.
Figure 18:
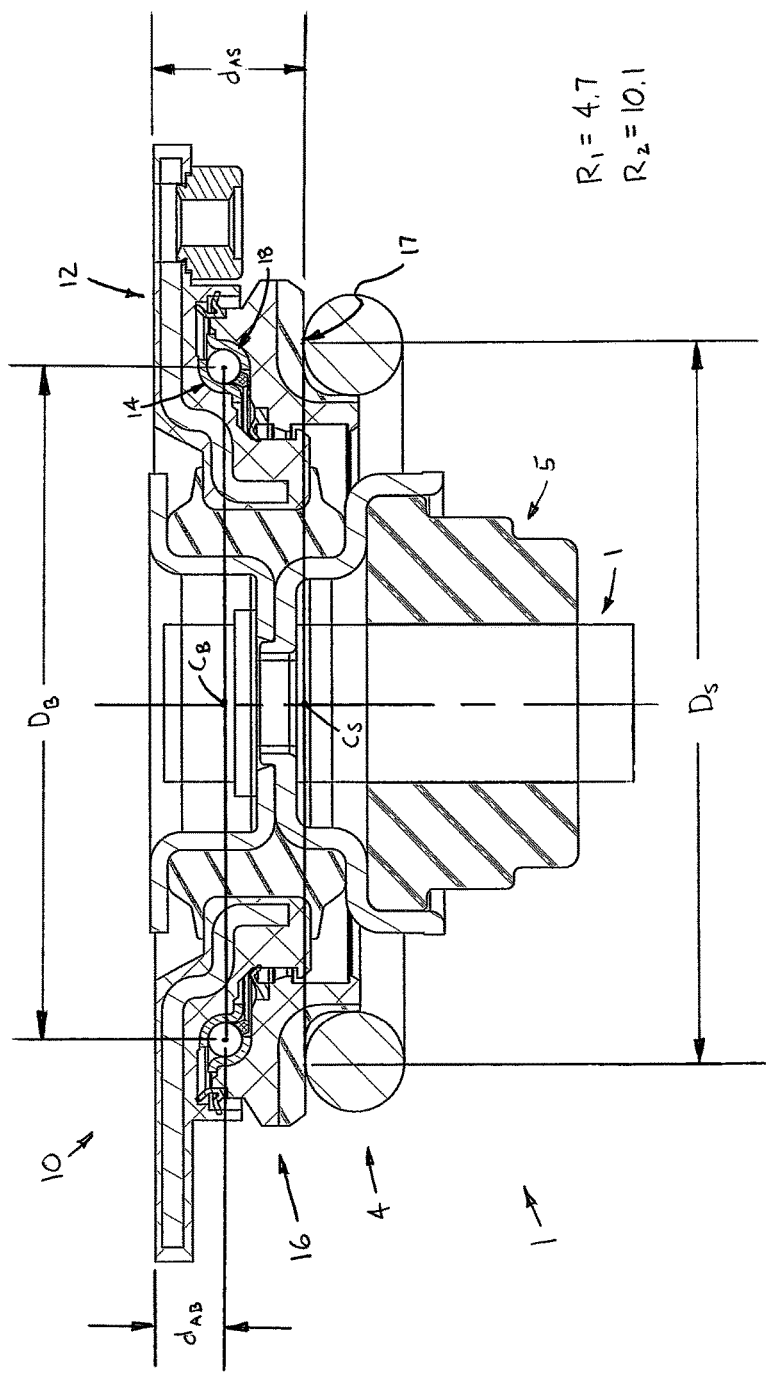
FIG. 18 is another view of the strut mount and bearing assembly of FIG. 16, indicating the spring seat engagement surface diameter, bearing pitch diameter and axial spacing of each from the strut mount attachment surface.
Figure 19:
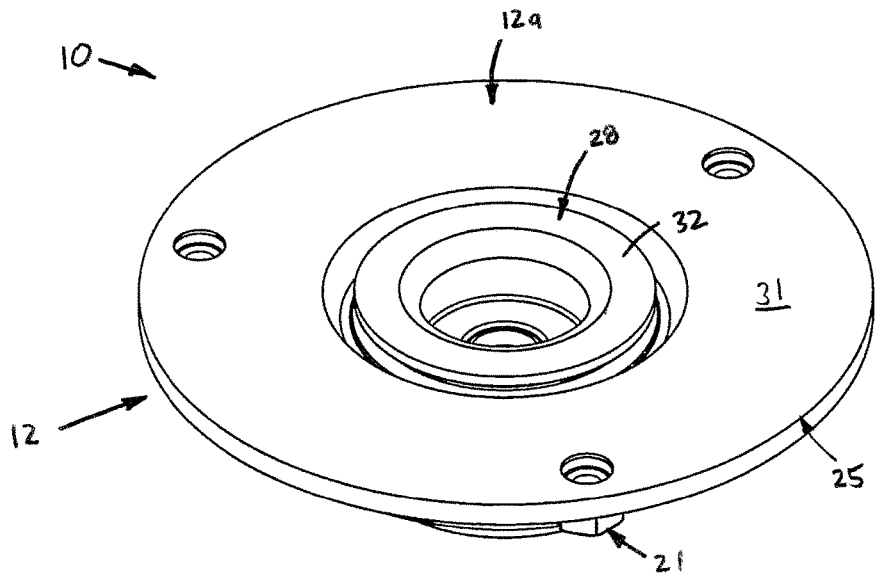
FIG. 19 is a top perspective view of the strut mount and bearing assembly construction of FIG. 16.
Figure 20:
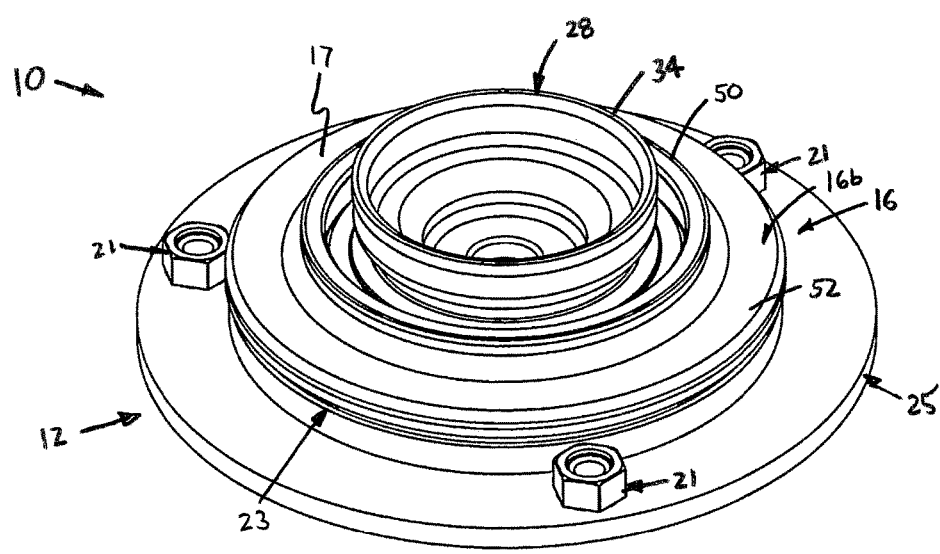
FIG. 20 is a bottom perspective view of the strut mount and bearing assembly construction of FIG. 16.
Figure 21:
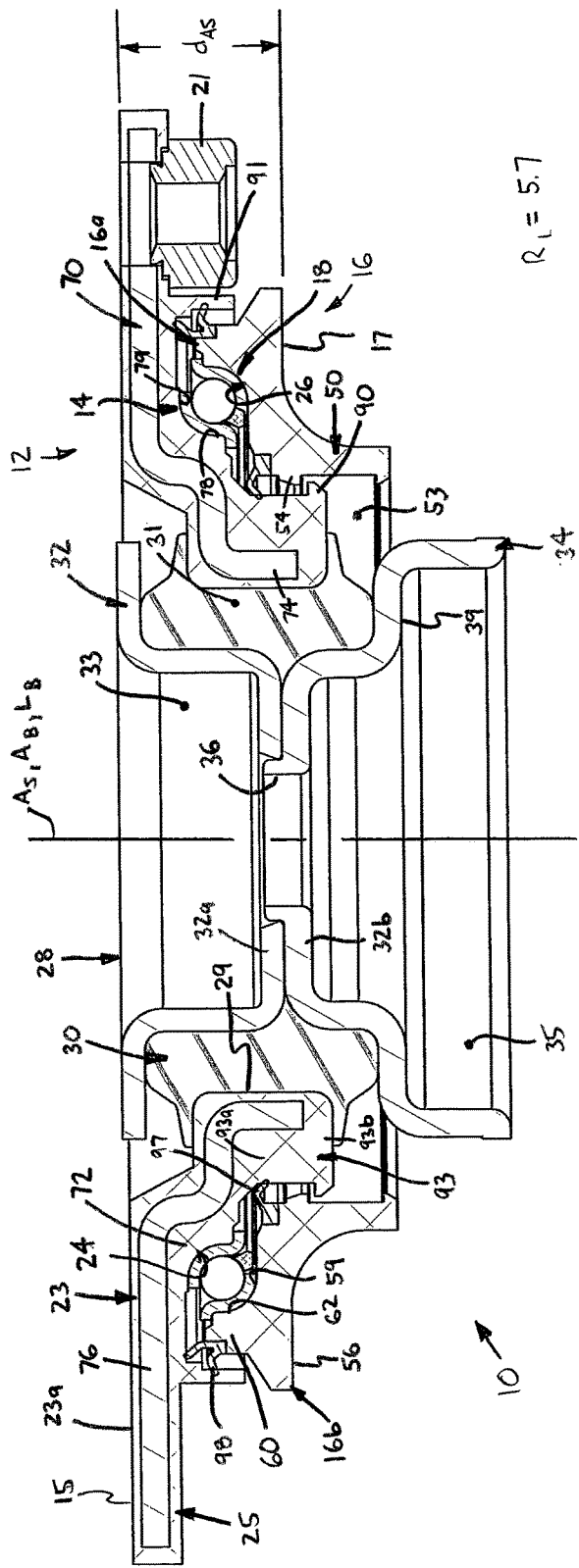
FIG. 21 is an axial cross-sectional view of the strut mount and bearing assembly construction of FIGS. 16-19, shown with an alternative one-piece spring seat.

To provide context for the above structural relationships, a typical bearing pitch diameter for an automotive wheel hub assembly may range between 60 mm and 130 mm. For sake of illustration, assuming a bearing pitch diameter $D_B$ of 100 mm for each of the various constructions yields the following dimensions and ratios. In a first strut mount and bearing construction of FIGS. 1-13, the spring contact diameter $D_S$ is about 106 mm, the spring axial distance $d_{AS}$ is about 27 mm and the ratio $R_1$ is about 3.9, while the bearing axial distance $d_{AB}$ is about 18 mm, such that the second ratio $R_2$ is about 5.5, as indicated in FIG. 5. In a second construction of FIGS. 14-15, the spring contact diameter $D_S$ is about 100 mm, the spring axial distance $d_{AS}$ is about 25 mm and the ratio $R_1$ is about 4, while the bearing axial distance $d_{AB}$ is about 14 mm and the second ratio $R_2$ is about 7.1, as indicated in FIG. 15. Further, with a third strut mount assembly construction of FIGS. 16-20, the spring contact diameter $D_S$ is about 108 mm, the spring axial distance $d_{AS}$ is about 23 mm and the ratio $R_1$ is about 4.7, while the bearing axial distance $d_{AB}$ is about 11 mm and the second ratio $R_2$ is about 10.1, as shown in FIG. 18. Also, in the modified version of the third construction formed with a one-piece spring seat, as discussed below, the spring axial distance reduces from 23 mm to 19 mm, such that the first ratio $R_1$ is about 5.7.

Figure 22:
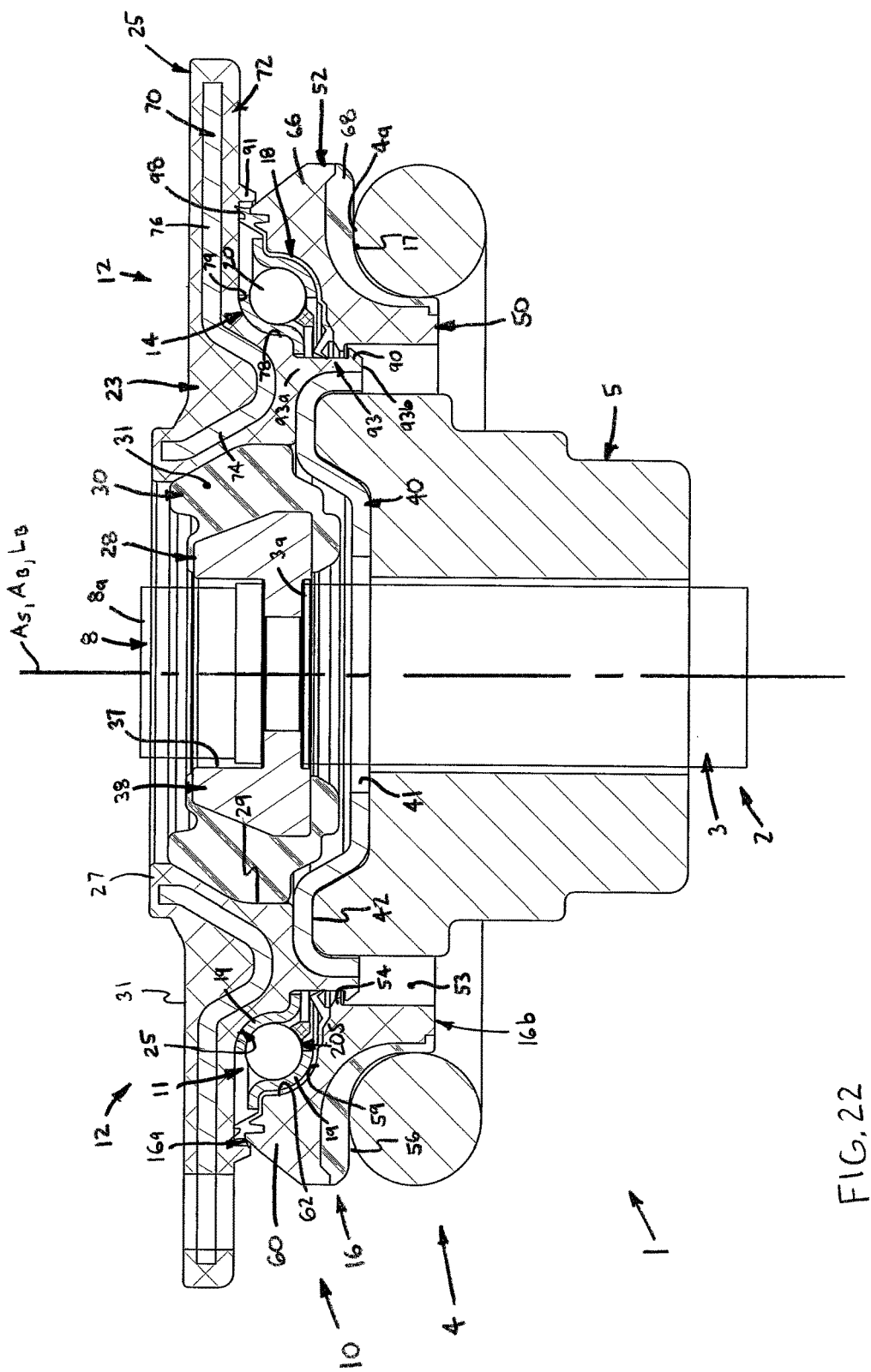
FIG. 22 is an axial cross-sectional view of a yet another alternative construction of the strut mount and bearing assembly, having a bearing axis aligned with the shock absorber axis and a shock bumper engaged with the strut mount body.
Figure 23:
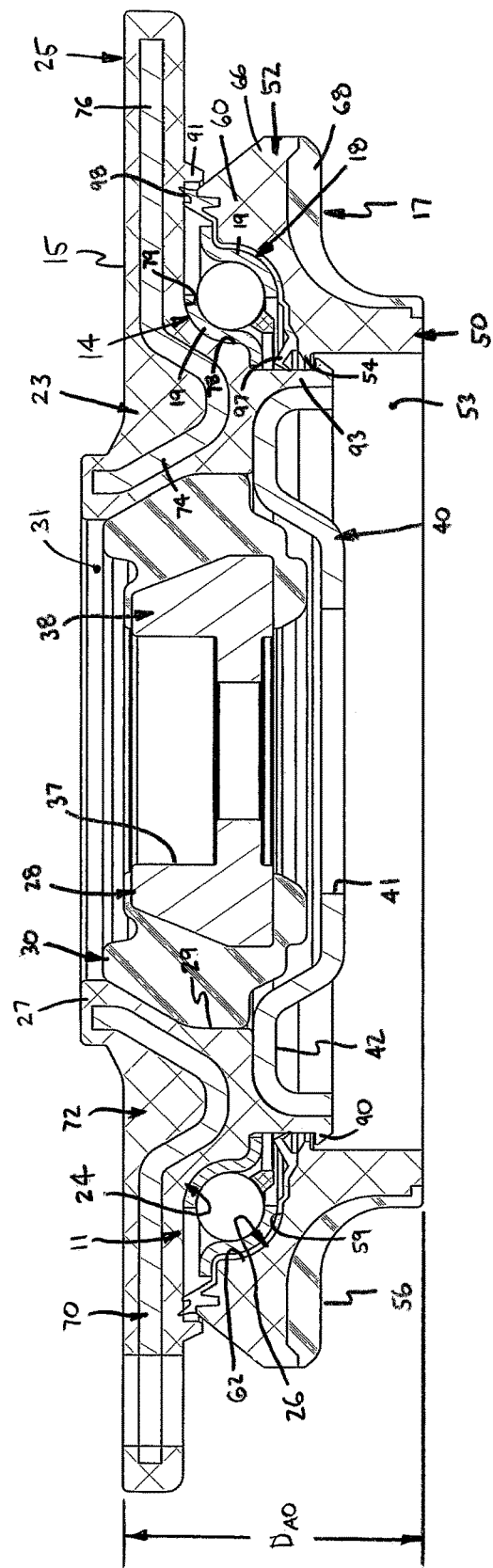
FIG. 23 is another axial cross-sectional view of the strut mount and being assembly construction of FIG. 22, shown without the suspension spring, shock absorber shaft and bumper.
Figure 24:
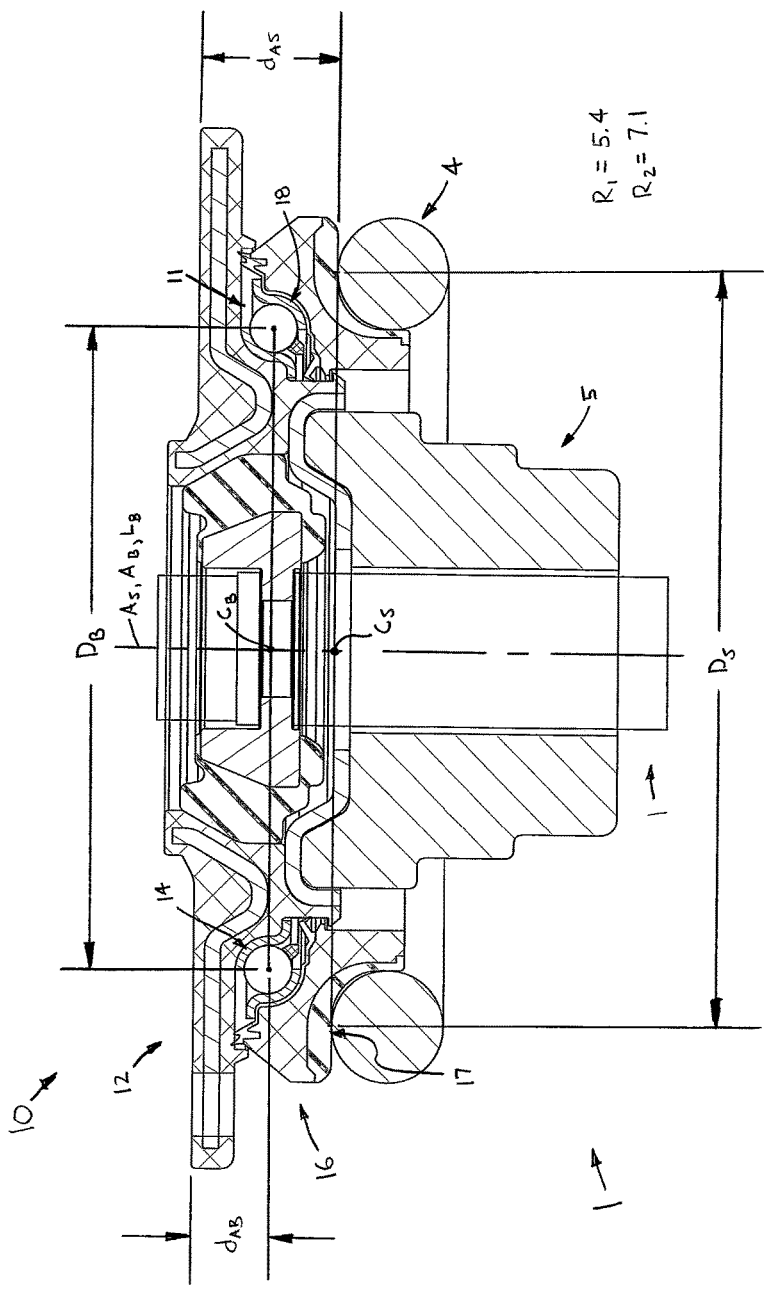
FIG. 24 is another view of the strut mount and bearing assembly of FIG. 22, indicating the spring seat engagement surface diameter, bearing pitch diameter and axial spacing of each from the strut mount attachment surface.

Furthermore, in the fourth construction of FIGS. 22-24, the spring contact diameter $D_S$ is about 129 mm, the spring axial distance $d_{AS}$ is about 24 mm and the first ratio $R_1$ is about 5.4, while the bearing axial distance $d_{AB}$ is about 14 mm and the second ratio $R_2$ is about 7.1, as indicated in FIG. 24. Additionally, in a fifth construction shown in FIGS. 25-27, the spring contact diameter $D_S$ is about 102 mm, the spring axial distance $d_{AS}$ is about 33 mm and the first ratio $R_1$ is about 3.1, while the bearing axial distance $d_{AB}$ is about 13 mm and the second ratio $R_2$ is about 7.7, as depicted in FIG. 27. Finally, in a fifth construction shown in FIGS. 28 and 29, the spring contact diameter $D_S$ is about 116 mm, the spring axial distance $d_{AS}$ is about 21 mm and the first ratio $R_1$ is about 5.5, while the bearing axial distance $d_{AB}$ is about 9 mm and the second ratio $R_2$ is about 11.1, as shown in FIG. 29. Thus, with the presently preferred constructions disclosed herein, the "spring spacing" ratio $R_1$ preferably has a value between 3.1 and 5.7 and the "bearing spacing" ratio $R_2$ preferably has a value between 5.5 and 10.1.

Referring now to FIGS. 2-5 and 14-29, the two bearing races 14, 18 are preferably relatively sized such that one bearing race 14 or 18 has an outside diameter larger than that of the other bearing race 18, 14, respectively. As such, the larger race 14 or 18 is disposed circumferentially about the other bearing race 18, 14 in order to provide radial and axial load support. Specifically, in the constructions depicted in FIGS. 1-13 and 16-29, the second bearing race 18 is sized diametrically larger than the first bearing race 14, such that the second race 18 has an outside diameter $D_2$ larger than the outside diameter $D_1$ of the first bearing race 14 and is disposed at least partially circumferentially about the first bearing race 12, as indicated in FIG. 4. In other constructions, as shown for example in FIGS. 14 and 15, the first bearing race 14 is sized diametrically larger than the second bearing race 18, such that the first race 14 has an outside diameter $D_1$ larger than the outside diameter $D_2$ of the second bearing race 18 and is disposed at least partially circumferentially about the second bearing race 18, as indicated in FIG. 14. Alternatively, the two bearing races 14, 18 may be substantially equally sized and configured to provide an axial thrust bearing (not depicted).

Further, the rolling elements 20 are preferably formed as balls and provide a ball set 20S and the two bearing races 14, 18 preferably extend both radially and axially so as to form an angular contact bearing assembly 11, as described below. However, the rolling elements 20 may instead be formed as cylinders, needles or any other known type of rolling element and/or the races 14, 18 may be formed as an axial "thrust" contact bearing assembly. Alternatively, the strut mount assembly 10 may be formed without any rolling elements, such that the first and second races 14, 18 are formed and engaged in the manner of a plain bearing.

Referring specifically to FIG. 4, each bearing race 14, 18 preferably includes a generally annular plate 19 with generally S-shaped axial cross-sections providing a concave raceway surface 19a and including a radially-extending portion 19b and an axially-extending portion 19c. As such, the bearing races 14, 18 are configured to support both radial and axial loading, in combination with support of the strut mount 12 and the spring seat 16, and most preferably form an angular contact bearing assembly, as discussed in further detail below. Further, each bearing plate 19 is preferably formed of a metallic material, such as low carbon steel, but may be formed of any other appropriate material. Alternatively, the first bearing race 14 may be provided by the upper race surface 24, and is thus formed directly on the strut mount 12, and the second bearing race 18 may be provided by the lower race surface 26, and is therefore formed directly on the spring seat 16. Specifically, the two races 14, 16 may be machined or otherwise provided on each part 12, 16, particularly if the mount 12 and seat 16 are formed of a metallic material.

Figure 10:
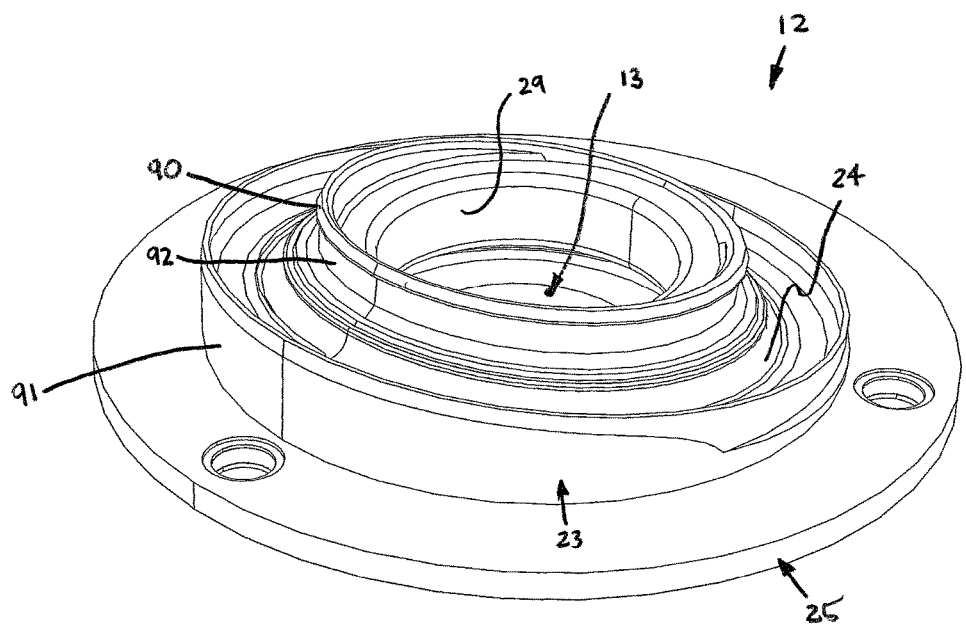
FIG. 10 is bottom perspective view of the strut mount of FIG. 8.

Referring to FIGS. 1-15, with strut mount and bearing assemblies 10 in which it is desired to align the bearing axis $A_B$ with an offset spring load centerline $L_S$, the cylindrical central section 23 of the strut mount body 22 is preferably generally wedge-shaped and has a generally circular, angled race surface 24 located proximal to the strut mount lower end 12b and extending circumferentially about the first bearing race axis $A_B$ so as to be generally centered on the axis $A_B$. The angled support surface 24 is formed on the strut mount body 22 so as to have a most proximal axial position $P_P$ with respect to the strut mount upper end 12a and a most distal axial position $P_D$ with respect to the strut mount upper end 12a, the two positions $P_P$, $P_D$ being spaced about one hundred eighty degrees (180°) apart, as indicated in FIG. 10. The first bearing race 14 is disposed on the strut mount support surface 24, which positions the circular race 14 in an angled orientation with respect to the bore centerline $L_B$, so to be at least generally centered about the spring centerline $L_S$. Preferably, the most proximal axial position $P_P$ is located at an axial distance $d_S$ of less than one inch (1") from the vehicle attachment surface 15 on the strut mount upper end 12a, so as to minimize the axial space requirement of the strut mount and bearing assembly 10, for reasons discussed below.

Alternatively, as shown in FIGS. 14-22, with strut mount assemblies 10 having the bearing axis $A_B$ aligned with the shock absorber axis $A_S$, the central cylindrical section 23 of the strut mount body 12 is preferably substantially circular cylindrical the upper race surface is generally circular and extends circumferentially and substantially coaxially about the bore centerline $L_B$, and thus about the shock absorber axis $A_S$. As such, the upper race surface 24 is formed on the strut mount body 22 so as to be at least generally equidistant from the mount upper end 12a at all points about the circumference of the race surface 24. With such a race surface 24, the bearing first race 14 is positioned substantially coaxially with the shock absorber axis $A_S$. Clearly, such a strut mount structure minimizes the overall axial length or height $D_{AO}$ of the strut mount 12, as discussed in further detail below.

In certain constructions of the strut mount and bearing assembly 10, as depicted in FIGS. 1-18, the strut mount cylindrical body 22 is formed such that the generally circular vehicle attachment surface 15 extends across the entire strut mount upper end 12a. As discussed above, the strut mount 12 is preferably disposed against a generally flat/planar body surface of the vehicle body 6 and connected with the body by a plurality of fasteners 21. In other structures depicted in FIGS. 22-27, the strut mount body 22 further includes an inner, axially-extending circular shoulder 27 extending upwardly from a remainder of the body upper end 23a, which is disposable within a circular pocket or recess (not shown) of the vehicle body 7 to assist in positioning the strut mount and bearing assembly 10 on the vehicle.

Referring now to FIGS. 2-4, 13-15 and 18-22, in all of the various constructions of the assembly 10, the strut mount body 22 has an inner circumferential surface 29 defining a body bore 31 and the strut mount 12 further includes a hub 28 disposed within the cylindrical body bore 31 (as best shown in FIG. 10) and a generally circular cylindrical damper 30 disposed generally coaxially between and connecting the hub 28 with the strut mount body 22. The hub 28 provides the strut mount central bore 13 and is configured to connect with the shock absorber shaft upper end 3a, as described in further detail below. Further, the strut mount body 22 is preferably formed such that the first and second bearing races 14, 18 extend circumferentially about the coaxially arranged hub 28 and damper 30, which enables a reduction in the overall axial length/height $D_{AO}$ of the strut mount assembly 10, as discussed in further detail below.

Preferably, the strut mount body 22 is formed of a first material, such as a rigid polymer (with or without a metallic insert to "rigidify" the body 22) or metallic material (e.g., aluminum) and the damper 30 is formed a second material, such as natural or synthetic rubber. The second, damper material has a substantially greater elasticity than the first, cylindrical body material such that the damper 30 is configured to reduce vibration within the strut mount 12, and thus the vehicle chassis (not shown) and the strut (and thereby the wheel (not shown)). Further, the damper 30 has an inside diameter $ID_D$, the hub 28 has an outside diameter $OD_H$ and the damper 30 and hub 28 are preferably sized such that the hub outside diameter $OD_H$ is larger than the damper inside diameter $ID_D$, as indicated in FIG. 4. As such, the damper 30 is thereby compressed between the hub 28 and the strut mount body 22, so as to provide a preload that optimizes the life of the rubber damper 30 by working only in compression and not in tension.

Referring to FIGS. 1-5, 14-18 and 21, in certain constructions of the strut mount and bearing assembly 10, the hub 28 is preferably formed of an assembly of two generally circular cups 32, 34 each having an inner base wall 32a, 34a disposed against the base wall 34a, 32a of the other cup 34, 32. The two cups 32, 34 have aligned central openings providing a clearance hole 36 for inserting a fastener 8 to attach the free end 3a of the shock absorber 3 to the hub cup base walls 32a, 34a, and thereby to the strut mount 12. Further, the upper cup 32 provides a bore 33 for receiving the head 8a of the fastener 8 and the lower cup 34 provides a bore 35 for receiving a portion of the bumper 5 and a circular bearing surface 39 against which is disposed the upper end 5a of the bumper 5, such that loading from the bumper 5 is transferred to the damper 30.

Referring to FIGS. 22-24, in one construction of the strut mount and bearing assembly 10, the hub 28 is formed of a generally circular cylindrical body 38 with a counterbore hole 37 for receiving the fastener 8 to connect the hub 28 with the shock absorber shaft end 3a. In this construction, the strut mount 12 further includes a generally circular transfer plate 40 attached to the strut mount body 23 and extending across the lower end of the strut mount body bore 27. The transfer plate 40 has a central clearance hole 41, through which extends a portion of shock absorber shaft 3, and circular bearing surface 42 against which the upper end 5a of the bumper 5 is disposed. As such, axial loading is transferred from the bumper 5 to the strut mount 12.

Figure 25:
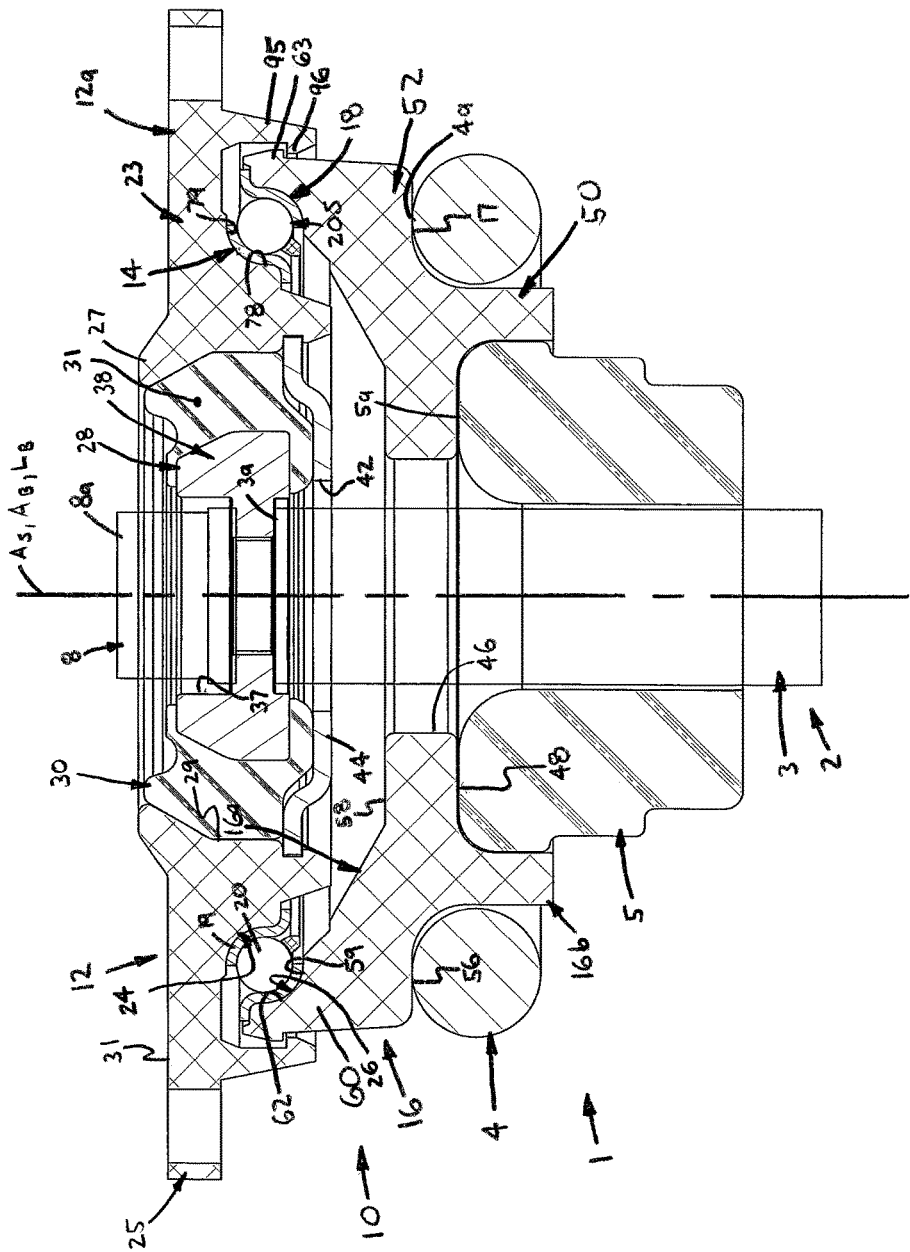
FIG. 25 is an axial cross-sectional view of an even further alternative construction of the strut mount and bearing assembly, having a bearing axis aligned with the shock absorber axis and a shock bumper engaged with the spring seat.
Figure 26:
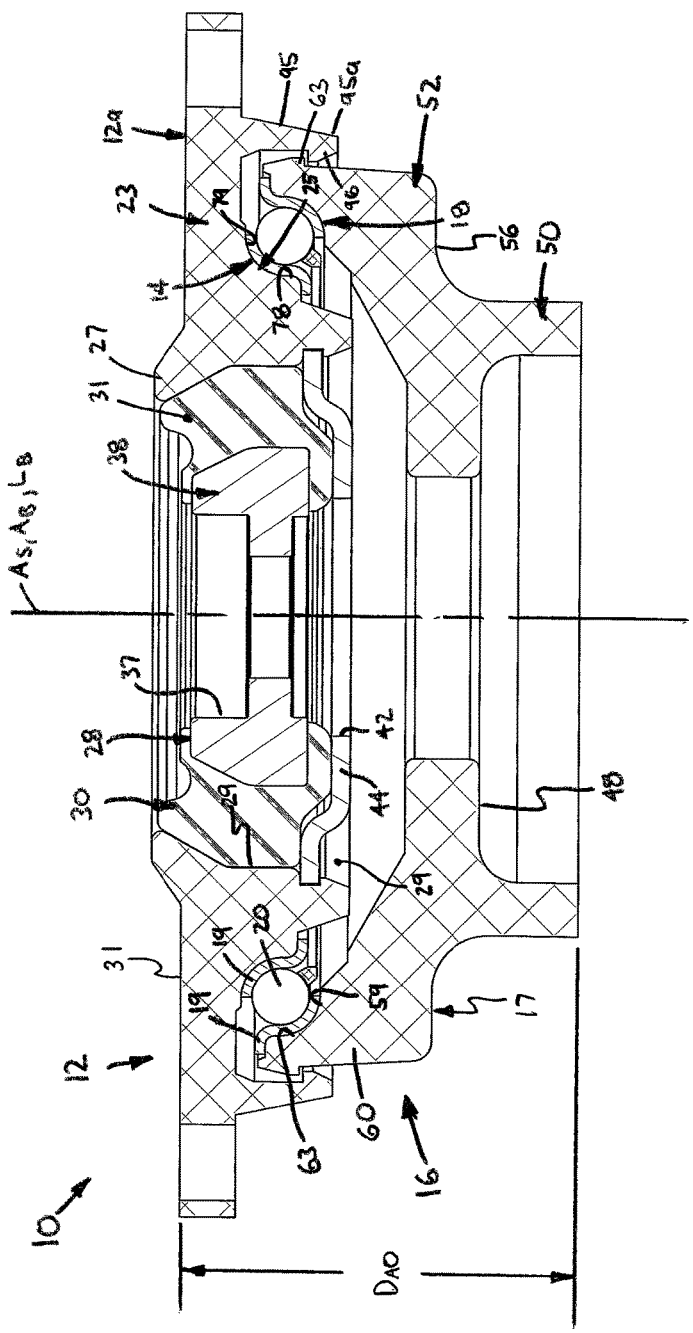
FIG. 26 is another axial cross-sectional view of the strut mount and being assembly construction of FIG. 25, shown without the suspension spring, shock absorber shaft and bumper.
Figure 27:
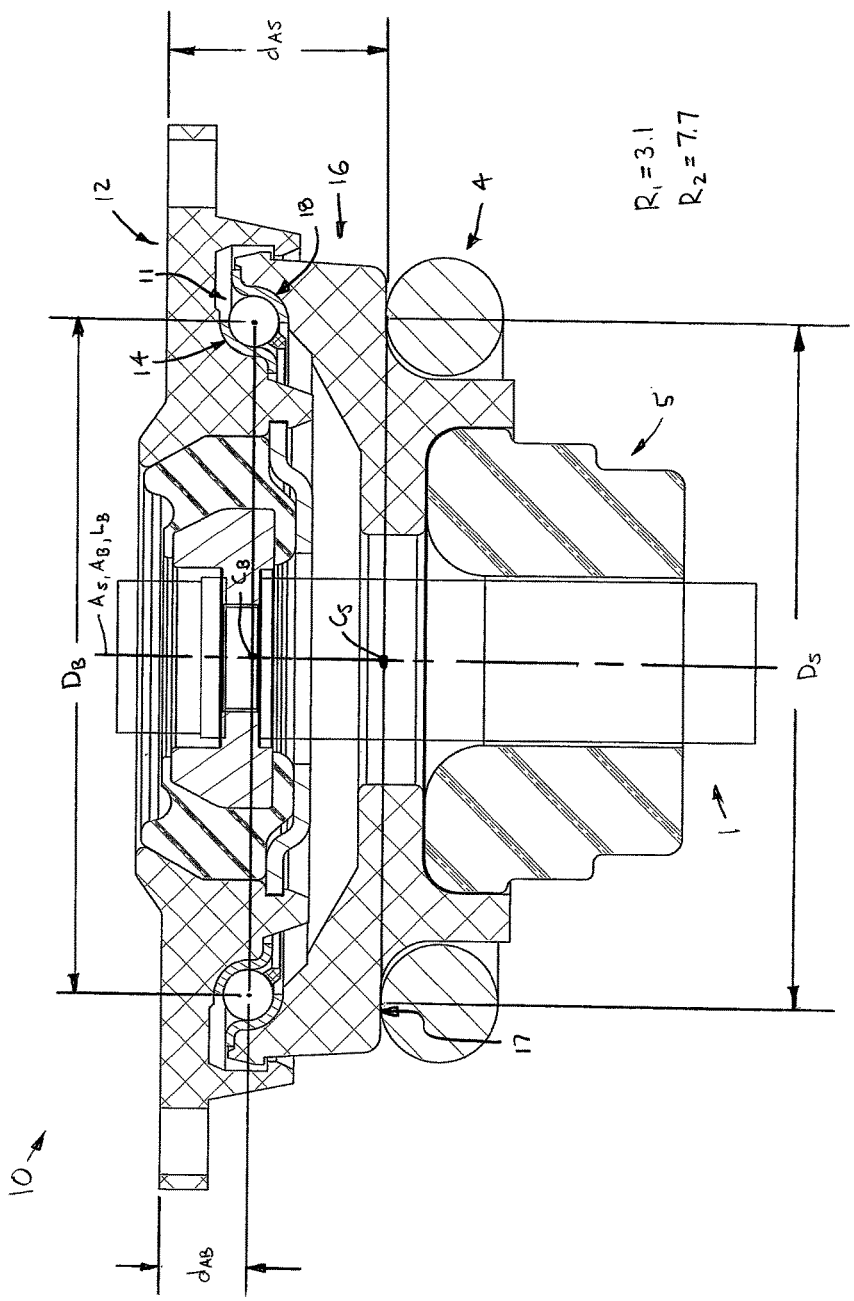
FIG. 27 is another view of the strut mount and bearing assembly of FIG. 25, indicating the spring seat engagement surface diameter, bearing pitch diameter and axial spacing of each from the strut mount attachment surface.

In yet another construction of the strut mount and bearing assembly 10 as shown in FIGS. 25-27, the hub 28 is also formed of a generally circular cylindrical body 38 with a counterbore hole 37 for receiving the fastener 8. In this construction, the strut mount 12 includes a generally circular support plate 44 attached to the strut mount body 23 and extending across the lower end of the strut mount body bore 27. The support plate 44 has a central clearance hole 42 for receiving a portion of the shock absorber shaft 3, but does not interact directly with the bumper 5. Instead, the hub portion 50 of the spring seat 16 has a counterbore hole 46 providing a bearing surface 48, against which is disposed the upper end 5a of the bumper 5. As such, all loading from the bumper 5 is transferred to the spring seat 16 as opposed to the strut mount 12.

Referring to FIGS. 1-5, 12-18, and 20-27, in most constructions of the strut mount and bearing assembly 10, the spring seat 16 is preferably generally axially symmetrical and includes a generally cylindrical central hub portion 50 disposeable within the upper end 4a of the spring 4 and a generally circular flange portion 52 extending radially outwardly from the hub portion 50. The hub portion 50 has an inner circumferential surface 51 defining a central bore 53 and, in most constructions, includes a generally annular engagement lip 54 extending radially inwardly from the bore inner surface 51, as shown in FIGS. 2-5, 13, 16-18 and 21-24. The flange portion 52 has a first radial surface 56 providing the spring contact surface 17 and an opposing, second radial surface 58 configured to support the attached second bearing race 18, specifically on a bearing radial support surface section 59, as described in further detail below.

Preferably, the spring seat 16 further includes a generally annular shoulder 60 projecting generally axially from the second radial surface 58 on the spring seat upper end 16a. The annular shoulder 60 provides either an inner circumferential, bearing axial support surface section 62 when the second bearing race 18 is diametrically larger than the first bearing race 14 (FIGS. 1-13 and 16-27) or an outer circumferential, bearing axial support surface section 64 when the second bearing race 18 is diametrically smaller than the first race 14, as shown in FIGS. 14 and 15. In either construction, the bearing second race 18 is preferably disposed against and attached to the shoulder support surface 62 or 64.

In one alternative construction depicted in FIGS. 14 and 15, the spring seat 16 is formed with an annular lip 61 extending radially outwardly from the outer perimeter of the flange portion 52. In another alternative construction shown in FIGS. 25-27, the hub portion 50 is formed without an inner annular lip and instead the spring seat 16 includes an annular lip 63 extending radially outwardly from the shoulder 60. In each alternative construction, the outer annular lip 61 or 63 is engageable with a retainer lip 94 or 96, respectively, of the strut mount 12, as described in detail below. As described in detail below, each of the lips 54, 61 or 63 enables assembly of the spring seat 16 and the second race 18 onto the strut mount 12 and the first race 14, and after the initial assembly, the lip 54, 61 or 63 retains the assembled components of the strut mount and bearing assembly 10 and prevents disassembly thereof without damaging the components.

Figure 28:
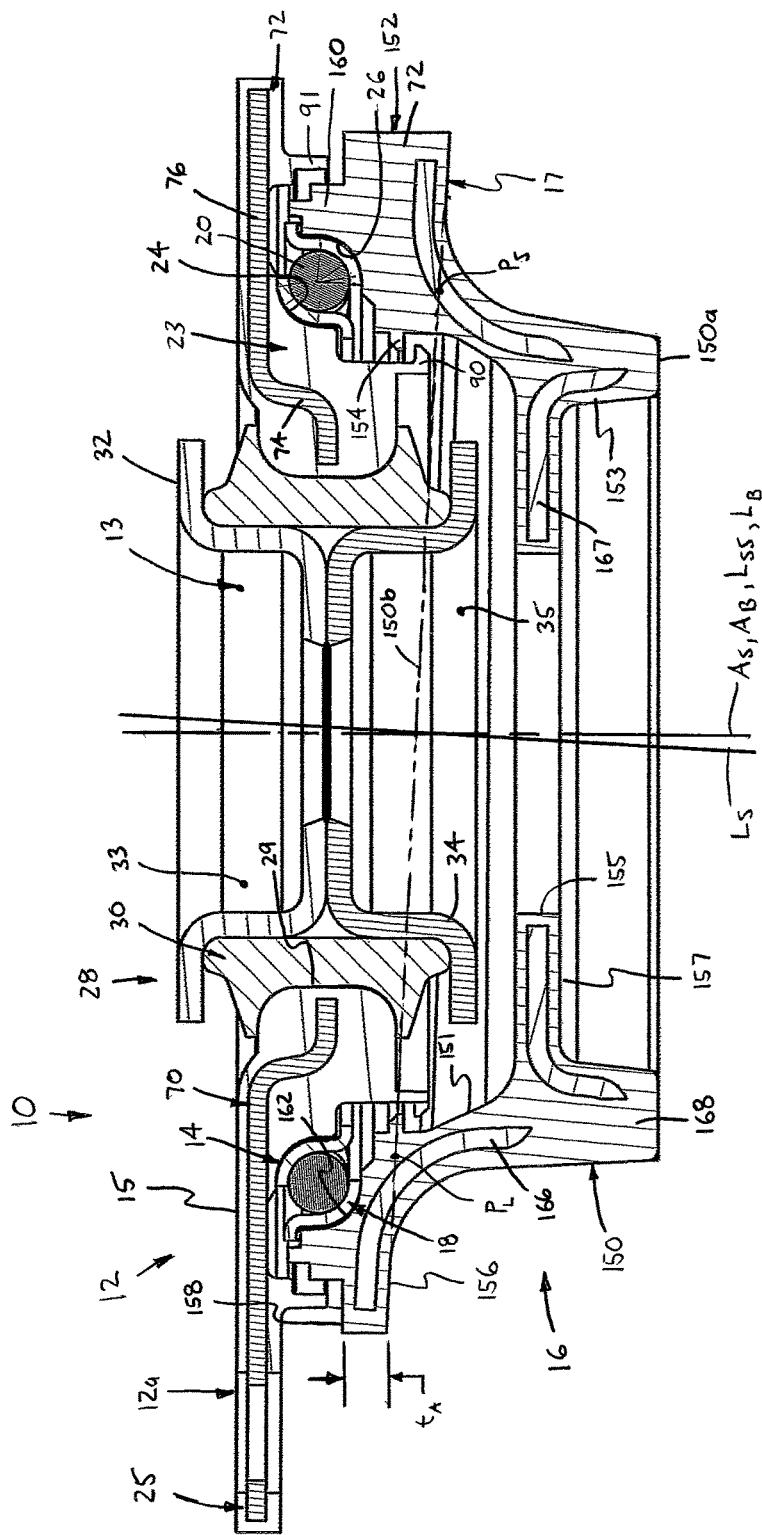
FIG. 28 is an axial cross-sectional view of yet an even further alternative construction of the strut mount and bearing assembly, having a bearing axis aligned with the shock absorber axis and a spring axis inclined with respect to the bearing axis.
Figure 29:
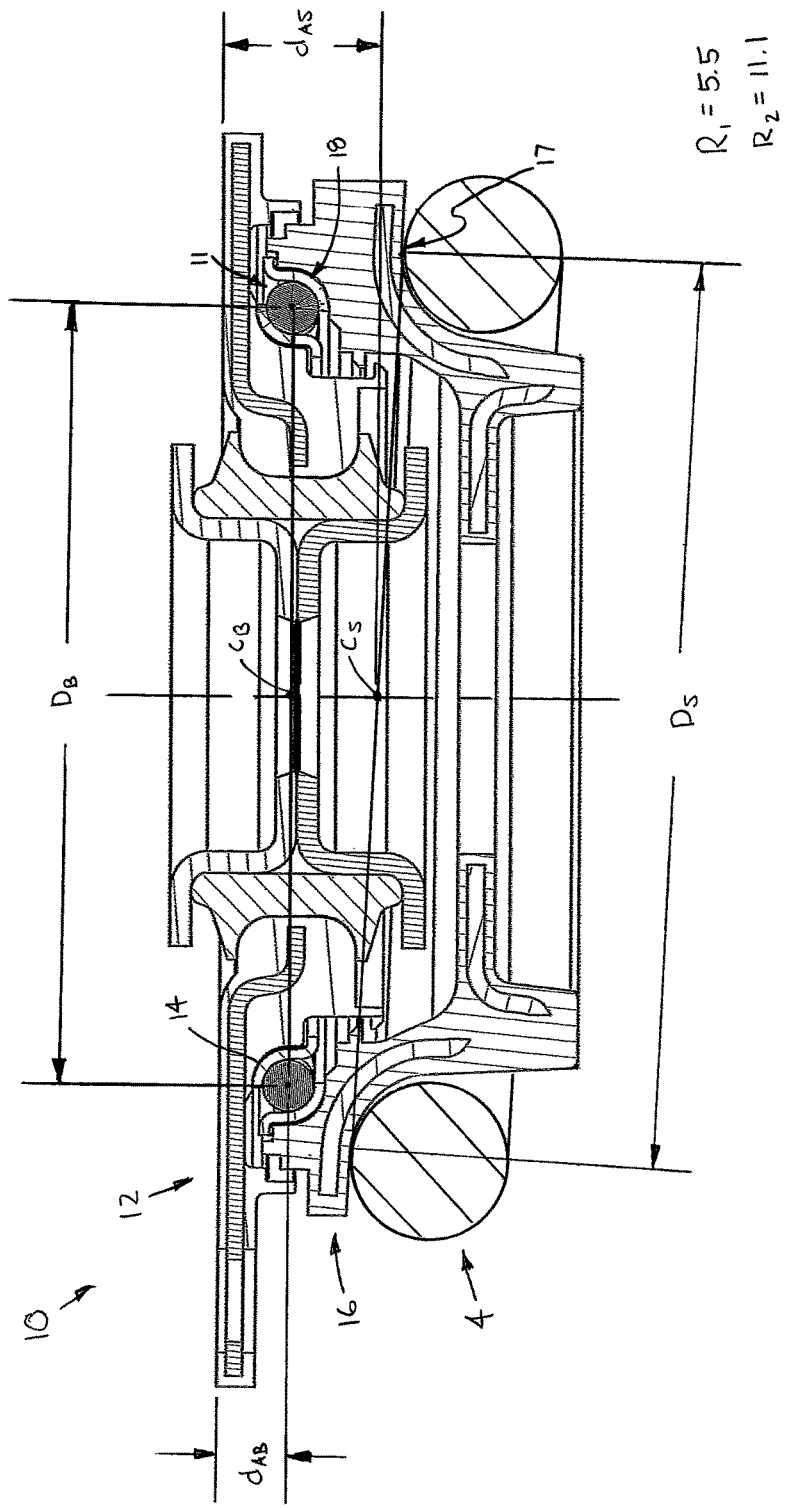
FIG. 29 is another view of the strut mount and bearing assembly of FIG. 28, indicating the spring seat engagement surface diameter, bearing pitch diameter and axial spacing of each from the strut mount attachment surface.

Referring to FIGS. 28 and 29, in another alternative construction, the spring seat 16 is asymmetrical about a seat centerline $L_{SS}$ and is configured to engage with a spring 4 having a load centerline $L_S$ that is angled or skewed with respect to the shock absorber axis $A_S$ and also supports a second bearing race 18 that is centered about the shock absorber axis $A_S$ (and thus also the strut mount bore centerline $L_B$). The spring seat 16 includes a generally cylindrical central hub portion 150 and a generally circular, generally wedge-shaped flange portion 152 extending radially outwardly from the hub portion 150. The hub portion 150 is disposeable within the upper end 4a of the spring 4 and has a generally circular lower end 150a and a generally elliptical upper end 150b that is angled with respect to the centerline $L_{SS}$ between an axially longest point $P_L$ and an axially shortest point $P_S$. The hub portion 150 also has upper and lower inner circumferential surfaces 151, 153, respectively, separated by a radially inwardly-extending shoulder 154 defining a central bore 155 and providing a bumper engagement surface 157. Also, a generally annular engagement lip 154 extends radially inwardly from the upper inner surface 151 of the hub portion 150.

Further, the wedge-shaped flange portion 152 has an axial length or thickness to that varies from a least value at the hub longest point $P_L$ and a greatest value at the hub shortest point $P_S$. The flange portion 152 also has a first radial surface 156 providing the spring contact surface 17, which is angled with respect to the spring seat centerline $L_{SS}$ and generally coaxial with the spring centerline $L_S$, and an opposing, second radial surface 158 configured to support the attached second bearing race 18, which is generally centered about the spring seat centerline $L_{SS}$. Furthermore, the spring seat 16 of FIGS. 28 and 29 also includes a generally annular shoulder 160 projecting generally axially from the second radial surface 158 on the spring seat upper end 16a. The annular shoulder 160 has an inner circumferential support surface section 162 providing the lower race surface 26, the bearing second race 18 being preferably disposed against and attached to the shoulder support surface 162.

In certain constructions as shown in FIGS. 2-5, 12, 13, 16-18 and 22-24, the spring seat 16 is of two-piece construction and includes an upper, inner member 66 formed of a rigid polymeric material (e.g., Peek, nylon, Delrin, etc., filled or not with glass fibers, glass balls, etc.) and a lower, outer member 68 formed of an elastomeric material (e.g., natural or synthetic rubber, filled or not with carbon black, thermoplastic elastomer, polymeric foam, etc.). The upper member 66 provides the shoulder 60, the bearing support surface 62 or 66 and the hub portion 50 and the lower member 68 provides the spring contact surface 17. With the preferred structure and materials, the upper member 66 is sufficiently rigid to adequately support the second bearing race 18 while the lower member 68 is capable of at least reducing vibrations within the strut spring 4. Alternatively, the lower member 68 may be formed of a rigid material, such as for example a metallic material (e.g., low carbon steel), as depicted in FIGS. 14 and 15. In other constructions, the spring seat 16 may alternatively be formed of one piece as shown in FIGS. 21, 25-27, preferably of a rigid polymer, or may be formed of three or more pieces, or/and formed of any other appropriate materials. In the construction of FIGS. 28 and 29, the spring seat 16 preferably includes an upper, generally annular rigid internal support member 166 and a lower, generally annular rigid internal support member 167, each preferably formed of a metallic material, and an over-molded body 168 preferably formed of a rigid polymeric material.

Referring now to FIGS. 2-5, 11, 14-18, 21-24, 28 and 29, in several of the various constructions of the strut mount and bearing assembly 10, the strut mount body 22 includes an inner metallic plate 70 and outer polymeric body 72 molded onto the plate 70. The inner plate 70 has a central, generally circular tubular portion 74 defining the strut mount body bore 25 and a generally circular flange portion 76 extending radially outwardly from the central tubular portion 74. The outer polymeric body 72 is either generally wedge-shaped (FIGS. 2-5, 11, 14 and 15) or generally circular cylindrical (FIGS. 14-18, 21-24, 28 and 29) and provides the bearing support surface 24 and other strut mount body integral structural features, as described below. Alternatively, as depicted in FIGS. 25-27, the strut mount body 22 may be of one-piece construction, such as for example, formed of a molded polymeric material (as depicted) or cast, sintered, forged and/or machined (or otherwise fabricated) from a metallic material, such as for example, aluminum or stainless steel.

As shown in FIGS. 2-5, 16-18, and 21-29, in most of the constructions of the strut mount and bearing assembly 10 described and depicted herein, the second bearing race 18 is sized diametrically larger than the first bearing race 14, as discussed above. With these structures, the strut mount body 22 is preferably formed such that the upper bearing surface 24 has an outer circumferential, race surface axial section 78 generally centered on either the bearing axis $A_B$ or the bore centerline $L_B$ and extending generally axially from a race surface radial section 79 of the race surface 24. In either case, the axial support surface section 78 and the support surface radial section 79 are preferably formed on the outer polymeric body 72. Further, with the preferred upper race surface 24, the first bearing race 14 is partially disposed against the mount body axial surface section 78 and the spring seat shoulder 60 or 160 is disposed circumferentially about the strut mount axial surface 78. As such, the outer circumferential, axial surface section 78 of the strut mount 12 and the inner circumferential, axial support surface 62 or 162 of the spring seat 16 enable the bearing assembly 11 to support radial loading, in addition to the axial thrust load support provided by the surface radial sections 59 and 79.

Alternatively, as shown in FIGS. 14 and 15, when the first bearing race 14 is sized diametrically larger than the second bearing race 18, the strut mount body 22 preferably further includes an angled, outer annular wall portion 80 extending axially downwardly from a remainder of the body 22 and circumferentially about the bearing axis $A_B$. The outer annular wall portion 80 is spaced radially outwardly from a central portion 84 of the body 22 so as to define generally annular groove 86, which is sized to receive the annular shoulder 60 of the spring seat 16. The angled race surface 24 is formed adjacent to the inner end of the outer wall portion 80 and an inner circumferential, surface axial section 88 is provided on the wall inner surface and extending axially from a surface radial section 89 of the race surface 24, which extends circumferentially about the outer circumferential bearing support surface 64 on the spring seat 16. With this structure, the inner circumferential, support axial surface section 88 of the strut mount 12 and the outer circumferential, axial support surface 64 of the spring seat 16 enable this variation of the bearing assembly 11 to support radial loading.

Referring now to FIGS. 2-5, 11, 16-18, 21-24, 28 and 29, in several constructions of the mount and bearing assembly 10, the strut mount 12 also includes a generally circular retainer lip 90 engageable with the spring seat lip 54 or 154 to retain the spring seat 16 movably coupled with the strut mount 12. The strut mount retainer lip 90 is either generally coaxial with the bearing axis $A_B$ so as to be angled with respect to the strut mount bore centerline $L_B$ (FIGS. 2-5 and 11) or coaxial with the strut mount bore centerline $L_B$ (FIGS. 16-18, 21-24, 28 and 29), as discussed in greater detail below.

Figure 11:
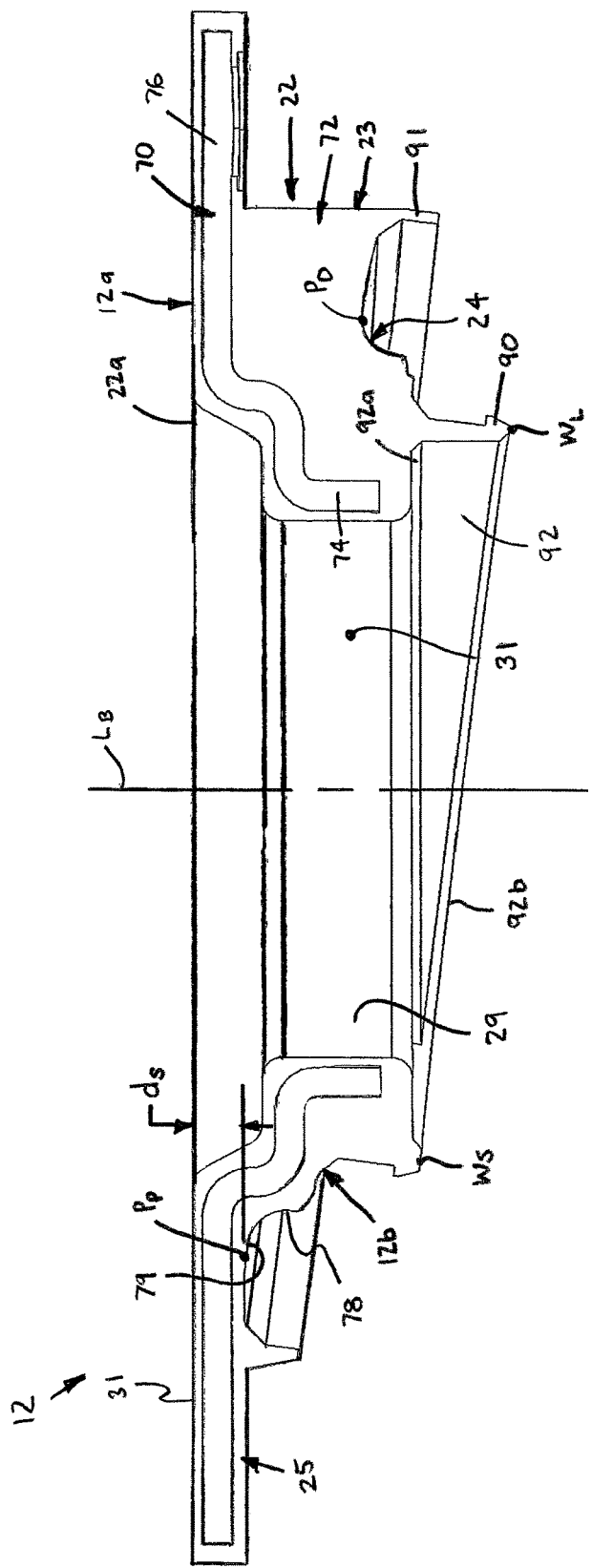
FIG. 11 is an axial cross-sectional view of the strut mount body of FIG. 8.

In "angled" assemblies of the strut mount 12 as disclosed in FIGS. 2-15, 11, 14 and 15, the strut mount body 22 further includes a generally tubular wall portion 92 disposed within the spring seat bore 33 and providing the retainer lip 90. The tubular wall portion 92 extends circumferentially about the strut mount central bore 12 and axially from a remainder of the strut mount body 22. Further, the tubular wall 92 has a first, generally circular end 92a integrally formed with a remainder of the strut mount body 22, preferably the outer polymeric body 52, and a second, free end 92b. The wall free end 92b is generally elliptical and is angled with respect to the bore centerline $L_B$, such that the wall 92 has an axially shortest portion $W_S$ and an axially longest portion $W_L$ spaced about one hundred eighty degrees (180°) from the axially shortest portion $W_S$, as indicated in FIG. 11. The wall portions $W_S$, $W_L$ are arranged such that each is generally radially aligned with a separate one of the most proximal and most distal axial positions $P_P$, $P_D$ of the strut mount bearing support surface 24. Further, the strut mount retainer lip 90 extends generally radially outwardly from the tubular wall 92 generally adjacent to the wall second axial end 92b.

In the symmetrical constructions depicted in FIGS. 16-18, 21-24, 28 and 29, the strut mount body 22 includes a generally circular cylindrical wall portion 93 disposed within the spring seat bore 53 and providing the retainer lip 90. The cylindrical wall portion 93 extends circumferentially about the strut mount central bore 13 and axially from a remainder of the strut mount body 23, and has a generally constant axial length. The wall 93 has a first, generally circular end 93a integrally formed with a remainder of the strut mount body 22, preferably the outer polymeric body 72, and a second, generally circular free end 93b. Further, the strut mount retainer lip 90 extends generally radially outwardly from the cylindrical wall portion 93 generally adjacent to the wall second axial end 93b.

With either of the above-structures, the spring seat 16 is rotatably coupled with the strut mount 12 by inserting the free end 92b or 93b of the wall portion 92, 93 respectively, into the spring seat bore 53 until the strut mount retainer lip 90 displaces axially past the spring seat engagement lip 54. At that point, the interaction between the two lips 54, 92 generally prevents axial displacement of the spring seat 16 with respect to the strut mount 12 under normal operating conditions, but enables the spring seat 16 to angularly displace about the strut mount tubular wall portion 92 or 93. When the orientation of the strut mount retainer lip 90 is angled with respect to the strut bore centerline $L_B$, but coaxial about the spring centerline $L_S$, the axially symmetrical spring seat 16 is positioned generally centered about the coaxial bearing axis $A_B$ and spring centerline $L_S$. Further, when the orientation of the strut mount retainer lip 90 is coaxial with respect to the strut bore centerline $L_B$, the axially symmetrical spring seat 16 is positioned generally centered about the coaxial strut mount bore centerline $L_B$ and the shock absorber shaft axis $A_S$.

In the alternative construction depicted in FIGS. 14 and 15, the angled outer wall portion 80 includes a generally circular retainer lip 94 extending radially inwardly from adjacent to the wall outer end 80a, and is generally coaxial with the spring centerline $L_S$. The strut mount retainer lip 94 is engageable with the spring seat outer annular engagement lip 61 to retain the spring seat 16 movably coupled with the strut mount 12, such that the spring seat 16 is angularly displaceable about the spring centerline $L_S$. In the construction depicted in FIGS. 25-27, the strut mount body 23 further includes an outer, generally circular tubular wall portion 95 extending generally axially from a remainder of the body 23. The tubular wall portion 95 includes a generally circular retainer lip 96 extending radially inwardly from adjacent to the wall outer end 95a, and is generally coaxial with the strut mount bore centerline $L_B$. The strut mount retainer lip 96 is engageable with the spring seat outer annular lip 63 to retain the spring seat 16 movably coupled with the strut mount 12, such that the spring seat 16 is angularly displaceable about the generally coaxial strut mount bore centerline $L_B$ and shock absorber shaft axis $A_S$.

Further, to prevent ingress of contaminants into the bearing assembly 11, the strut mount 12 preferably further includes a generally circular skirt 91 extending generally circumferentially about the bearing axis $A_B$, so as to be angled with respect to the bore centerline $L_B$ (FIGS. 1-15) or generally coaxial with bore centerline $L_B$ (FIGS. 16-29). The skirt 91 is disposed circumferentially about the second bearing race 18 of the spring seat 16, most preferably about the spring seat shoulder 60, so as to provide a barrier about the bearing races 14, 18. Furthermore, most constructions of the strut mount and bearing assembly 10 preferably further includes inner and outer annular seals 97, 98, respectively, disposed on either side of the bearing assembly 11. Specifically, in the constructions depicted in FIGS. 1-13 and 16-21, the inner seal 97 is mounted on the inner end 50a of the spring seat hub portion 50 and engages with an outer circumferential surface 99 of the strut mount body 22, whereas the outer seal 98 is mounted on the outer perimeter of the spring seat shoulder 60 and engages with an inner circumferential surface 91a of the tubular skirt 91. Most preferably, the seals 97, 98 are generally formed as disclosed in U.S. Patent Application Publication No. US 2013/0277161A1, published on Oct. 24, 2013, the entire contents of which are incorporated by reference herein. Furthermore, in the construction depicted in FIGS. 14 and 15, the inner seal 97 is mounted on the shoulder 60 of the spring seat 16 and engages with an outer circumferential surface 100 of the strut mount body 22 and the outer seal 98 is mounted on the outer perimeter of the spring seat flange portion 52 and engages with the inner surface 91a of the tubular skirt 91. Furthermore, the construction depicted in FIGS. 25-27 does not include the inner and outer seals.

Due to the following structural features of the strut mount and bearing assembly 10, the axial space requirements, or total axial length $D_{AO}$ of the assembly 10, is minimized. First, by having the upper race 14 attached (or formed) directly on the strut mount 12 and the lower race 18 attached/formed directly on the spring seat 16, instead of requiring additional components to attach the upper race 14 to the mount 12 and the lower race 18 to the seat 16 as per the current state of the art, and having the spring seat 16 directly coupled with the strut mount 12, all components for a separate bearing assembly attached individually to the strut mount 12 and to the spring seat 16 are eliminated. Also, by positioning the upper race 24 and the spring contact surface 17 in relatively close proximity to the upper attachment surface 15, as indicated by the above-discussed first and second ratios $R_1$, $R_2$, minimizes the required axial height $D_{AO}$ of the strut mount and bearing assembly 10. Further, the arrangement of the hub 28 and damper 30 being coaxially disposed within the strut mount 12, and the bearing races 14, 18 being disposed about the hub 28 and damper 30, reduces the axial stacking of such components as found in previously known strut mount assemblies, and by having a single unit mount-damper-hub as opposed to two or more distinct components facilitates handling of these components during the assembly of the strut mount and bearing assembly 10 into the vehicle suspension. Additionally, having the upper race 14 mounted on the strut mount 12 to form a single unit eliminates the potential for relative movement between the upper race and the mount as with previously known strut bearing assemblies, and thereby eliminates the noise generated by such relative motion as found with prior art strut bearing assemblies.

Also, by forming the bearing races 14, 18 such that the lower race 18 is disposed circumferentially about the upper race 14, and the uppermost portion of upper race 14 being located as proximal to the strut mount upper end 12a as reasonably practicable, it is possible to provide a bearing assembly 11 that is angled, so as to be aligned with the spring centerline $L_S$, while minimizing axial length/height $D_{AO}$. Due to minimization of the overall axial height $H_A$ of the strut mount assembly 10, the additional space may be utilized to increase the length of the suspension spring 4, which increases vehicle riding comfort, to reduce the vehicle hood height, and/or to provide more space between the strut mount 12 and the vehicle hood (not shown) for better pedestrian protection and more flexibility for the front vehicle design.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A strut mount and bearing assembly for connecting a wheel strut unit with a vehicle body, the strut unit including a shock absorber with a shaft extending along a central shock absorber axis and a suspension spring having a load centerline, the assembly comprising:

a strut mount having upper and lower ends, a central bore extending generally between the upper and lower ends and a generally annular upper race surface disposed between the upper and lower ends and extending circumferentially about the bore, the upper end being configured to fixedly connect with the vehicle body and having a generally flat attachment surface extending substantially perpendicularly to the centerline and disposeable against a surface of the vehicle body, the central bore being configured to receive an upper end of the shock absorber shaft and having a centerline extending generally collinearly with the shock absorber axis;

a generally annular, first bearing race disposed on or provided by the upper race surface of the strut mount and having a central axis, the bearing race axis being generally coaxial or parallel with the spring load centerline;

a spring seat movably coupled with the strut mount and having an upper end with a generally annular lower race surface and a lower end with a generally circular engagement surface contactable by an upper end of the suspension spring, the engagement surface having a center and a diameter;

a generally annular, second bearing race disposed on or provided by the lower race surface of the spring seat and arranged facing generally toward and spaced axially from the first bearing race; and a plurality of rolling elements disposed between the first and second bearing races so as to form a bearing;

wherein the strut mount and the spring seat are sized and configured such that a ratio of the diameter of the spring engagement surface to an axial distance between the upper attachment surface and the engagement surface center is greater than two (2); and wherein one of:

the second bearing race has a diameter larger than a diameter of the first bearing race and is disposed at least partially circumferentially about the first bearing race; and the first bearing race has a diameter larger than a diameter of the second bearing race and is disposed at least partially circumferentially about the second bearing race.

2. The strut mount and bearing assembly as recited in claim 1 wherein the bearing has a pitch diameter and the first race is formed on the strut mount such that a ratio of the bearing pitch diameter to an axial distance between the center of the pitch diameter and the strut mount attachment surface is greater than three (3).

3. The strut mount and bearing assembly as recited in claim 2 wherein:

the strut mount and the spring seat are sized and configured such that the ratio of the diameter of the spring engagement surface to the axial distance between the upper attachment surface and the engagement surface center is greater than three (3); and the first race is formed on the strut mount such that the ratio of the bearing pitch diameter to the axial distance between the center of the pitch diameter and the strut mount attachment surface is greater than five (5).

4. The strut mount and bearing assembly as recited in claim 1 wherein the strut mount includes a generally cylindrical central section providing the strut mount lower end and a generally annular flange section extending radially outwardly from the central section and providing the strut mount upper end and the upper attachment surface, the first race being formed on the cylindrical section and having at least a portion located generally adjacent to the flange section.

5. The strut mount and bearing assembly as recited in claim 4 wherein the strut mount flange section includes a plurality of through holes each configured to receive a separate fastener engageable with the vehicle body to fixedly connect the strut mount to the vehicle body.

6. The strut mount assembly as recited in claim 4 wherein the first race is formed on the strut mount such that the bearing race axis is skewed with respect to the bore centerline so as to define an angle with a value greater than zero degrees and the spring seat is coupled with the strut mount so as to be angularly displaceable about the bearing race axis.

7. The strut mount and bearing assembly as recited in claim 6 wherein the strut mount includes a generally wedge-shaped, circular cylindrical body having a generally circular, angled support surface proximal to the strut mount lower end and extending circumferentially about the bearing race axis, the support surface having a most proximal axial position with respect to the strut mount upper end and a most distal axial position with respect to the strut mount upper end, the first bearing race being disposed on the support surface.

8. The strut mount and bearing assembly as recited in claim 7 wherein the strut mount cylindrical body includes an inner metallic plate, the plate having a central tubular portion and generally circular flange portion extending radially outwardly from the central tubular portion, and an outer, generally wedge-shaped cylindrical polymeric body molded onto the metallic plate.

9. The strut mount and bearing assembly as recited in claim 4 wherein the strut mount cylindrical body has an inner circumferential surface defining a body bore and the strut mount further includes a hub disposed within the cylindrical body bore, the hub providing the strut mount central bore and being configured to connect with the shock absorber upper end, and a generally circular cylindrical damper disposed generally coaxially between and connecting the hub with the strut mount body.

10. The strut mount and bearing assembly as recited in claim 9 wherein the strut mount cylindrical body is formed of a first material and the damper is formed of a second material, the second material having a substantially greater elasticity than the first material such that the damper is configured to reduce vibration within the assembly.

11. The strut mount and bearing assembly as recited in claim 9 wherein the first and second bearing races extend circumferentially about the hub and the damper.

12. The strut mount and bearing assembly as recited in claim 1 wherein the spring seat includes a central bore and a generally annular lip extending radially inwardly from the bore and the strut mount includes a generally circular retainer lip engageable with the spring seat lip to retain the spring seat coupled with the strut mount, the strut mount retainer lip being generally coaxial with the first bearing race so as to be angled with respect to the strut mount bore centerline.

13. The strut mount and bearing assembly as recited in claim 12 wherein the strut mount further includes a generally tubular wall extending circumferentially about the strut mount central bore, disposed within the spring seat bore and having a first, generally circular end integrally formed with a remainder of the strut mount body and a second, generally elliptical free end angled with respect to the strut mount bore centerline such that the tubular wall has an axially shortest portion and an axially longest portion spaced about one hundred eighty degrees from the axially shortest portion, the strut mount retainer lip extending radially outwardly from the tubular wall generally adjacent to the wall second axial end.

14. The strut mount and bearing assembly as recited in claim 13 wherein the strut mount includes a generally circular skirt extending generally circumferentially about the bearing central axis so as to be angled with respect to the strut mount bore centerline and disposeable circumferentially about the second bearing race of the spring seat so as to prevent ingress of materials into the first and second bearing races.

15. The strut mount and bearing assembly as recited in claim 1 wherein the spring seat includes a generally cylindrical central hub portion disposeable within the upper end of the spring and a flange portion extending radially from the hub portion, the flange having a first radial surface providing the spring contact surface and an opposing, second radial surface providing the second race surface.

16. The strut mount and bearing assembly as recited in claim 15 wherein the spring seat includes:

an upper member formed of a substantially rigid polymer and including the central hub portion and the flange first radial surface; and a lower member formed of a substantially flexible elastomeric material, attached to the upper member and providing the flange second, lower surface.

17. The strut mount and bearing assembly as recited in claim 16 wherein the spring seat includes a generally annular shoulder projecting generally axially from the spring seat upper end and providing one of an inner circumferential support surface and an outer circumferential support surface, the second race surface being at least partially disposed on the shoulder support surface.

18. The strut mount and bearing assembly as recited in claim 17 wherein one of:
the strut mount race surface is an outer circumferential surface generally centered on the spring axis and the spring seat shoulder is disposed circumferentially about the strut mount first race surface
the strut mount race surface includes an inner circumferential surface generally centered on the spring load centerline and the spring seat shoulder is disposed within the strut mount support surface.

19. A strut mount and bearing assembly for connecting a wheel strut unit with a vehicle body, the strut unit including a shock absorber with a shaft extending along a central shock absorber axis and a suspension spring having a load centerline, the assembly comprising:
a strut mount having upper and lower ends, a central bore extending generally between the upper and lower ends and a generally annular upper race surface disposed between the upper and lower ends and extending circumferentially about the bore, the upper end being configured to fixedly connect with the vehicle body and having a generally flat attachment surface extending substantially perpendicularly to the centerline and disposeable against a surface of the vehicle body, the central bore being configured to receive an upper end of the shock absorber shaft and having a centerline extending generally collinearly with the shock absorber axis;
a generally annular, first bearing race disposed on or provided by the upper race surface of the strut mount and having a central axis, the bearing race axis being generally coaxial or parallel with the spring load centerline;
a spring seat movably coupled with the strut mount and having an upper end with a generally annular lower race surface and a lower end with a generally circular engagement surface contactable by an upper end of the suspension spring, the engagement surface having a center and a diameter;
a generally annular, second bearing race disposed on or provided by the lower race surface of the spring seat and arranged facing generally toward and spaced axially from the first bearing race; and
a plurality of rolling elements disposed between the first and second bearing races so as to form a bearing;
wherein the strut mount and the spring seat are sized and configured such that a ratio of the diameter of the spring engagement surface to an axial distance between the upper attachment surface and the engagement surface center is greater than two (2); and
wherein the strut mount includes a generally cylindrical central section providing the strut mount lower end and a generally annular flange section extending radially outwardly from the central section and providing the strut mount upper end and the upper attachment surface, the first race surface being formed on the cylindrical section and having at least a portion located generally adjacent to the flange section, strut mount flange section including a plurality of through holes each configured to receive a separate fastener engageable with the vehicle body to fixedly connect the strut mount to the vehicle body.

20. A strut mount and bearing assembly for connecting a wheel strut unit with a vehicle body, the strut unit including a shock absorber with a shaft extending along a central shock absorber axis and a suspension spring having a load centerline, the assembly comprising:
a strut mount having upper and lower ends, a central bore extending generally between the upper and lower ends and a generally annular upper race surface disposed between the upper and lower ends and extending circumferentially about the bore, the upper end being configured to fixedly connect with the vehicle body and having a generally flat attachment surface extending substantially perpendicularly to the centerline and disposeable against a surface of the vehicle body, the central bore being configured to receive an upper end of the shock absorber shaft and having a centerline extending generally collinearly with the shock absorber axis;
a generally annular, first bearing race disposed on or provided by the upper race surface of the strut mount and having a central axis, the bearing race axis being generally coaxial or parallel with the spring load centerline;
a spring seat movably coupled with the strut mount and having an upper end with a generally annular lower race surface and a lower end with a generally circular engagement surface contactable by an upper end of the suspension spring, the engagement surface having a center and a diameter;
a generally annular, second bearing race disposed on or provided by the lower race surface of the spring seat and arranged facing generally toward and spaced axially from the first bearing race; and
a plurality of rolling elements disposed between the first and second bearing races so as to form a bearing;
wherein the strut mount and the spring seat are sized and configured such that a ratio of the diameter of the spring engagement surface to an axial distance between the upper attachment surface and the engagement surface center is greater than two (2); and
wherein the strut mount includes a generally cylindrical central section providing the strut mount lower end and a generally annular flange section extending radially outwardly from the central section and providing the strut mount upper end and the upper attachment surface, the first race surface being formed on the strut mount cylindrical section such that the bearing central axis is skewed with respect to the bore centerline so as to define an angle with a value greater than zero degrees and having at least a portion located generally adjacent to the flange section, and the spring seat being coupled with the strut mount so as to be angularly displaceable about the bearing axis.

21. A strut mount and bearing assembly for connecting a wheel strut unit with a vehicle body, the strut unit including a shock absorber with a shaft extending along a central shock absorber axis and a suspension spring having a load centerline, the assembly comprising:
a strut mount having upper and lower ends, a central bore extending generally between the upper and lower ends and a generally annular upper race surface disposed between the upper and lower ends and extending circumferentially about the bore, the upper end being configured to fixedly connect with the vehicle body and having a generally flat attachment surface extending substantially perpendicularly to the centerline and disposeable against a surface of the vehicle body, the central bore being configured to receive an upper end of the shock absorber shaft and having a centerline extending generally collinearly with the shock absorber axis;

a generally annular, first bearing race disposed on or provided by the upper race surface of the strut mount and having a central axis, the bearing race axis being generally coaxial or parallel with the spring load centerline;

a spring seat movably coupled with the strut mount and having an upper end with a generally annular lower race surface and a lower end with a generally circular engagement surface contactable by an upper end of the suspension spring, the engagement surface having a center and a diameter;

a generally annular, second bearing race disposed on or provided by the lower race surface of the spring seat and arranged facing generally toward and spaced axially from the first bearing race; and a plurality of rolling elements disposed between the first and second bearing races so as to form a bearing;

wherein the strut mount and the spring seat are sized and configured such that a ratio of the diameter of the spring engagement surface to an axial distance between the upper attachment surface and the engagement surface center is greater than two (2);

wherein the spring seat includes a central bore and a generally annular lip extending radially inwardly from the bore and the strut mount includes a generally circular retainer lip engageable with the spring seat lip to retain the spring seat coupled with the strut mount, the strut mount retainer lip being generally coaxial with the first bearing race so as to be angled with respect to the strut mount bore centerline; and wherein the strut mount further includes a generally tubular wall extending circumferentially about the strut mount central bore, disposed within the spring seat bore and having a first, generally circular end integrally formed with a remainder of the strut mount body and a second, generally elliptical free end angled with respect to the strut mount bore centerline such that the tubular wall has an axially shortest portion and an axially longest portion spaced about one hundred eighty degrees from the axially shortest portion, the strut mount retainer lip extending radially outwardly from the tubular wall generally adjacent to the wall second axial end.

22. A strut mount and bearing assembly for connecting a wheel strut unit with a vehicle body, the strut unit including a shock absorber with a shaft extending along a central shock absorber axis and a suspension spring having a load centerline, the assembly comprising:

a strut mount having upper and lower ends, a central bore extending generally between the upper and lower ends and a generally annular upper race surface disposed between the upper and lower ends and extending circumferentially about the bore, the upper end being configured to fixedly connect with the vehicle body and having a generally flat attachment surface extending substantially perpendicularly to the centerline and disposeable against a surface of the vehicle body, the central bore being configured to receive an upper end of the shock absorber shaft and having a centerline extending generally collinearly with the shock absorber axis;

a generally annular, first bearing race disposed on or provided by the upper race surface of the strut mount and having a central axis, the bearing race axis being generally coaxial or parallel with the spring load centerline;

a spring seat movably coupled with the strut mount and having an upper end with a generally annular lower race surface and a lower end with a generally circular engagement surface contactable by an upper end of the suspension spring, the engagement surface having a center and a diameter;

a generally annular, second bearing race disposed on or provided by the lower race surface of the spring seat and arranged facing generally toward and spaced axially from the first bearing race; and a plurality of rolling elements disposed between the first and second bearing races so as to form a bearing;

wherein the strut mount and the spring seat are sized and configured such that a ratio of the diameter of the spring engagement surface to an axial distance between the upper attachment surface and the engagement surface center is greater than two (2); and wherein the spring seat includes a generally cylindrical central hub portion disposeable within the upper end of the spring and a flange portion extending radially from the hub portion, the flange having a first radial surface providing the spring contact surface and an opposing, second radial surface providing the second race surface.

* * * * *